(12) United States Patent
Nakada

(10) Patent No.: US 8,910,529 B2
(45) Date of Patent: Dec. 16, 2014

(54) GAS FLOW-RATE VERIFICATION SYSTEM AND GAS FLOW-RATE VERIFICATION UNIT

(75) Inventor: Akiko Nakada, Kasugai (JP)

(73) Assignee: CKD Corporation, Komaki (JP)

( * ) Notice: Subject to any disclaimer, the term of this patent is extended or adjusted under 35 U.S.C. 154(b) by 212 days.

(21) Appl. No.: 13/523,206

(22) Filed: Jun. 14, 2012

(65) Prior Publication Data

US 2013/0036833 A1    Feb. 14, 2013

(30) Foreign Application Priority Data

Aug. 10, 2011    (JP) ................. 2011-174867

(51) Int. Cl.
*G01F 1/34* (2006.01)
*G05D 7/06* (2006.01)
*G01F 25/00* (2006.01)

(52) U.S. Cl.
CPC ............... *G01F 1/34* (2013.01); *G05D 7/0641* (2013.01); *G01F 25/0053* (2013.01)
USPC ........................................ 73/861.42; 73/861

(58) Field of Classification Search
USPC ............................................. 73/861.42, 861
See application file for complete search history.

(56) References Cited

U.S. PATENT DOCUMENTS

| | | | | |
|---|---|---|---|---|
| 7,658,204 B2 * | 2/2010 | Ishida | ........................... | 137/486 |
| 7,823,436 B2 * | 11/2010 | Monkowski et al. | .......... | 73/1.26 |
| 2008/0195332 A1 * | 8/2008 | Wong et al. | ...................... | 702/45 |
| 2009/0019943 A1 * | 1/2009 | Ozawa et al. | ................... | 73/861 |
| 2009/0063059 A1 * | 3/2009 | Nakada et al. | .................. | 702/47 |

FOREIGN PATENT DOCUMENTS

| | | | |
|---|---|---|---|
| JP | A-4-77808 | 3/1992 | |
| JP | 11223538 A * | 8/1999 | ............... G01F 1/34 |
| JP | A-11-223538 | 8/1999 | |
| JP | A-2003-529218 | 9/2003 | |
| JP | A-2008-504613 | 2/2008 | |
| JP | A-2011-510404 | 3/2011 | |
| WO | WO 2009/091935 A1 | 7/2009 | |

OTHER PUBLICATIONS

Japanese Office Action issued in Japanese Patent Application No. 2011-174867 dated Jun. 18, 2013 (w/ translation).

* cited by examiner

*Primary Examiner* — Lisa Caputo
*Assistant Examiner* — Jamel Williams
(74) *Attorney, Agent, or Firm* — Oliff PLC

(57) ABSTRACT

A gas flow-rate verification system includes: process gas lines each being arranged to supply gas from a process gas supply source to a process chamber through a first line cutoff valve, a second line a cutoff valve, and flow control device; and a shared gas line connected in a branch form to the process gas lines to discharge gas from a shared gas supply source through the second line cutoff valve and the flow control device. The shared gas line includes a shared cutoff valve, a measuring tank, a first pressure sensor, and a pressure regulating valve. When the first line cutoff valve and the shared cutoff valve are closed, the first pressure sensor measures a pressure drop of gas in the tank to verify a flow rate of the flow control device. The pressure regulating valve feedback-controls secondary side pressure of the pressure regulating valve.

12 Claims, 9 Drawing Sheets

US 8,910,529 B2

GAS FLOW-RATE VERIFICATION SYSTEM AND GAS FLOW-RATE VERIFICATION UNIT

CROSS-REFERENCE TO RELATED APPLICATIONS

This application is based upon and claims the benefit of priority from the prior Japanese Patent Application No. 2011-174867, filed Aug. 10, 2011, the entire contents of which are incorporated herein by reference.

TECHNICAL FIELD

The present invention relates to a gas flow-rate verification system and a gas flow-rate verification unit to verify or check a flow rate of a flow control device (a mass flow controller, etc.) used in a gas supply system for process gas and others in a semiconductor manufacturing device.

BACKGROUND ART

In coating or deposition devices, dry etching devices, and others in a semiconductor manufacturing process, for example, special gases such as silane, corrosive gasses such as chlorine gas, combustible gasses such as hydrogen gas and phosphine gas, and so on are used. Gas flow rates of those gases directly influence the quality (good/bad) of products and thus have to be strictly controlled. Especially, in association with recent laminated and miniaturized structures of semiconductor substrates, a demand for high reliability of process gas supply systems has been increased.

Therefore, for example, Patent Documents 1 and 2 disclose techniques of controlling flow rates of gases to be supplied in semiconductor manufacturing processes.

Patent Document 1 discloses a technique to alternately operate a system in a flow mode and a no-flow mode to adjust a flow rate of gas batchwise flowing through a mass flow controller to a specified flow rate. Specifically, a flow line is provided in which a cutoff valve, a reference capacity (corresponding to a measuring tank), a pressure sensor, and a pressure regulating valve are arranged in series on an upstream side of the mass flow controller. An actual flow rate is determined based on pressure drop in the reference capacity and a set value of the mass flow controller is adjusted.

Patent Document 2 discloses a technique to accurately calculate a flow rate of process gas. Specifically, a cutoff valve, a known volume part (corresponding to a measuring tank) including a heat storage part, a pressure sensor, and a variable pressure regulating valve are arranged in series on an upstream side of a mass flow controller. An actual flow rate is calculated based on pressure drop in the known volume part, and the variable pressure regulating valve is corrected if the actual flow rate differs from a specified flow rate. When the pressure drop in the known volume part is measured in terms of time function, heat transfer from the heat storage part is conducted to keep a gas temperature constant.

RELATED ART DOCUMENTS

Patent Documents

Patent Document 1: Japanese Translation of PCT International Application Publication No. JP 2003-529218
Patent Document 2: Japanese Translation of PCT International Application Publication No. JP 2008-5049613

DISCLOSURE OF THE INVENTION

Problems to be Solved by the Invention

However, the techniques described in Patent Documents 1 and 2 have the following disadvantages.

In the techniques of the Patent Documents 1 and 2, if a primary side pressure of the mass flow controller greatly varies, both the flow rate of the mass flow controller and the flow rate flowing out of the tank vary. Further, if the primary side pressure of the mass flow controller varies little, the flow rate of the mass flow controller does not vary, whereas the flow rate flowing out of the tank varies. Therefore, the pressure regulating valve is placed on a primary side (an inlet side) of the mass flow controller in order to make the primary side pressure of the mass flow controller constant. The placement of the pressure regulating valve can restrain variations in flow rate of the mass flow controller.

However, the inventor found that the pressure between the pressure regulating valve and the mass flow controller, corresponding to the primary side pressure of the mass flow controller, varied under the influence of the volume between the pressure regulating valve (PRV) and the mass flow controller (hereinafter, also referred to as a "PRV secondary side volume"). FIGS. 9A to 9C are graphs showing results of experiments conducted by the inventor. Herein, the pressure on a primary side of the pressure regulating valve is referred to as a PRV primary side pressure (PT1). As shown in FIGS. 9A and 9B, assuming that a gas flow rate to be supplied from the primary side of the pressure regulating valve is 50 sccm, the pressure between the pressure regulating valve and the mass flow controller (hereinafter, also referred to as "PRV secondary side pressure (PT2)") is compared between configurations having a PRV secondary side volume of 20 cc (FIG. 9A) and a PRV secondary side volume of 150 cc (FIG. 9B). This comparison result reveals that the PRV secondary side pressure (PT2) is higher in the 150-cc volume configuration than the 20-cc volume configuration.

Accordingly, for example, when a pipe length between the pressure regulating valve and the mass flow controller is changed for the purpose of modifications of the semiconductor manufacturing device and others, the PRV secondary side volume is changed. This affects pressure variations of the primary side pressure of the mass flow controller, resulting in deteriorated accuracy of gas flow-rate verification.

Furthermore, the inventor found that the PRV secondary side pressure also varies when a gas flow rate supplied from a gas supply source is changed. As shown in FIGS. 9B and 9C, assuming that the PRV secondary side volume is 150 cc, the PRV secondary side pressure (PT2) is compared between cases of supplying a process gas from the primary side of the pressure regulating valve at a flow rate of 50 sccm (FIG. 9B) and at a flow rate of 10 sccm (FIG. 9C). This comparison result shows that the PRV secondary side pressure is lower in the case of 10-sccm flow rate than in the case of 50-sccm flow rate.

Accordingly, for example, even when the gas flow rate supplied from the gas supply source is changed because of changes in operational status of the semiconductor manufacturing device, it influences variations in the primary side pressure of the mass flow controller, resulting in deteriorated accuracy of gas flow-rate verification.

In the techniques of Patent Documents 1 and 2, the upstream-side cutoff valve, the reference capacity or the known volume part (each corresponding to the "measuring tank"), the pressure sensor, and the pressure regulating valve are connected in series through a flow passage. When the upstream-side cutoff valve is closed and then a process gas accumulated in the measuring tank is supplied to the flow passage, the gas pressure to be measured by a pressure sensor in a midpoint of the flow passage is influenced by adiabatic expansion immediately after the cutoff valve is closed. Thus, a rate of pressure drop of the gas pressure is not constant at an initial stage of pressure drop (see a conventional example shown in FIG. 4). Accordingly, gas flow-rate verification is not conducted until the pressure drop rate becomes almost constant. A wait time is thus needed.

In this regard, the technique of Patent Document 2 is provided with the heat storage parts on outer and inner peripheries of the known volume part (corresponding to the "measuring tank") and heat transfer from the heat storage parts is performed to avoid the influence of adiabatic expansion.

However, the apparatus including the heat storage parts on the outer and inner peripheries of the known volume part is increased in whole size because of the heat storage parts, leading to an increase in apparatus cost. Such a configuration is therefore undesirable. In the configuration that the heat storage part is provided on the inner periphery of the known volume part, the process gas accumulates in the heat storage part. Such old gas staying in the heat storage part may be mix with a new process gas during replacement. Further, in a case of using high corrosive gas, the heat storage part itself may be corroded.

The present invention has been made to solve the above problems and has a purpose to provide a gas flow-rate verification system and a gas flow-rate verification unit capable of reducing variations in secondary side pressure of a pressure regulating valve to accurately verify or check a gas flow rate discharged from a flow control device.

Another purpose is to provide a gas flow-rate verification system and a gas flow-rate verification unit capable of effectively keeping a constant rate of pressure drop in a measuring tank.

Means of Solving the Problems (1) To achieve the above purpose, one aspect of the invention provides a gas flow-rate verification system including: a plurality of process gas lines each including a first line cutoff valve, a second line cutoff valve, and a flow control device to supply gas from a process gas supply source to a process chamber through the first line cutoff valve, the second line cutoff valve, and the flow control device; and a shared gas line connected in a branch form to the process gas lines to discharge gas from a shared gas supply source through the second line cutoff valve and the flow control device; wherein the shared gas line includes a shared cutoff valve, a measuring tank, a first pressure sensor, and a pressure regulating valve, when the first line cutoff valve and the shared cutoff valve are closed, the first pressure sensor measures a pressure drop of gas in the tank to verify a flow rate of the flow control device, and the pressure regulating valve feedback-controls secondary side pressure of the pressure regulating valve.

(2) Another aspect of the invention provides a gas flow-rate verification system including: a plurality of process gas lines each including a first line cutoff valve, a second line cutoff valve, and a flow control device to supply gas from a process gas supply source to a process chamber through the first line cutoff valve, the second line cutoff valve, and the flow control device; and a shared gas line connected in a branch form to the process gas lines to discharge gas from a shared gas supply source through the second line cutoff valve and the flow control device; wherein each of the process gas lines includes a measuring tank, a first pressure sensor, and a pressure regulating valve between the first line cutoff valve and the second line cutoff valve, and the shared gas line includes a shared cutoff valve, when the first line cutoff valve and the shared cutoff valve are closed, the first pressure sensor measures a pressure drop of gas in the tank to verify a flow rate of the flow control device, and the pressure regulating valve feedback-controls secondary side pressure of the pressure regulating valve.

(3) In the gas flow-rate verification system described in (1) or (2), it is preferable to further include a second pressure sensor for measuring the secondary side pressure of the pressure regulating valve, the second pressure sensor being located in or downstream of the pressure regulating valve, and wherein the pressure regulating valve includes a controller for controlling pressure based on a pressure signal difference between a first pressure signal from the first pressure sensor and a second pressure signal from the second pressure sensor.

(4) In the gas flow-rate verification system described in any one of (1) to (3), preferably, the measuring tank is provided in a manifold on an upper end of which the first pressure sensor and the pressure regulating valve are placed, and the manifold is formed with flow passages separately communicating with inside of the tank to respectively connect the first pressure sensor and the pressure regulating valve to the tank.

(5) In the gas flow-rate verification system described in (4), preferably, the manifold includes, in a lower end, a cover member sealing a lower end of the tank.

(6) To achieve the above purpose, another aspect of the invention provides a gas flow-rate verification unit including: a shared gas line connected in a branch form to a plurality of process gas lines each including a first line cutoff valve, a second line cutoff valve, and a flow control device to supply gas from a process gas supply source to a process chamber through the first line cutoff valve, the second line cutoff valve, and the flow control device, the shared gas line being configured to discharge gas from a shared gas supply source through the second line cutoff valve and the flow control device to the process gas lines; wherein the shared gas line includes a shared cutoff valve, a measuring tank, a first pressure sensor, and a pressure regulating valve, when the first line cutoff valve and the shared cutoff valve are closed, the first pressure sensor measures a pressure drop of gas in the tank to verify a flow rate of the flow control device, and the pressure regulating valve includes a control device for feedback-controlling secondary side pressure of the pressure regulating valve.

(7) Still another aspect of the invention provides a gas flow-rate verification unit including: a shared gas line connected in a branch form to a plurality of process gas lines each including a first line cutoff valve, a second line cutoff valve, and a flow control device to supply gas from a process gas supply source to a process chamber through the first line cutoff valve, the second line cutoff valve, and the flow control device, the shared gas line being configured to discharge gas from a shared gas supply source through the second line cutoff valve and the flow control device to the process gas lines; wherein each of the process gas lines includes a measuring tank, a first pressure sensor, and a pressure regulating valve between the first line cutoff valve and the second line cutoff valve, and the shared gas line includes a shared cutoff valve, when the first line cutoff valve and the shared cutoff valve are closed, the first pressure sensor measures a pressure drop of gas in the tank to verify a flow rate of the flow control device, and the pressure regulating valve includes a control device for feedback-controlling secondary side pressure of the pressure regulating valve.

(8) In the gas flow-rate verification unit described in (6) or (7), it is preferable to further include a second pressure sensor for measuring the secondary side pressure of the pressure regulating valve, the second pressure sensor being located in or downstream of the pressure regulating valve, and the control device includes a controller for controlling pressure based on a pressure signal difference between a first pressure signal from the first pressure sensor and a second pressure signal from the second pressure sensor.

(9) In the gas flow-rate verification unit described in any one of (6) to (8), preferably, the measuring tank is provided in a manifold on an upper end of which the first pressure sensor and the pressure regulating valve are placed, and the manifold is formed with flow passages separately communicating with inside of the tank to respectively connect the first pressure sensor and the pressure regulating valve to the tank.

(10) In the gas flow-rate verification unit described in (9), preferably, the manifold includes, in a lower end, a cover member sealing a lower end of the tank.

Effects of the Invention

The operations and advantageous effects of the gas flow-rate verification system according to the present invention will be explained below.

By the above configuration (1), it is possible to reduce variations in secondary side pressure of the pressure regulating valve, enabling high accurate verification of the gas flow rate discharged from the flow control device.

Specifically, since the pressure regulating valve (PRV) feedback-controls the secondary side pressure of the pressure regulating valve, for example, it is possible to reliably reduce variations in secondary side pressure of the pressure regulating valve even when the gas pressure of the shared gas supply source varies, the inner pressure of the tank drops (the PRV primary side pressure varies), the PRV secondary side volume changes, the gas flow rate supplied from the shared gas supply source varies, and so on. The secondary side pressure of the pressure regulating valve is also the primary side pressure of the flow control device (a mass flow controller and others) and thus the primary side pressure of the flow control device is stabilized. Therefore, the gas flow rate discharged from the flow control device and the flow rate from the tank are made stable. This can reduce an error between the gas flow rate calculated from the pressure drop in the tank and the gas flow rate actually discharged from the flow control device. The measurement accuracy of the gas flow-rate verification system can be enhanced.

For instance, if a pipe length between the pressure regulating valve and the flow control device is changed by modifications of a semiconductor manufacturing device or another purpose, the PRV secondary side volume is changed. When this PRV secondary side volume is changed, the secondary side pressure of the pressure regulating valve is apt to change. However, the secondary side pressure of the pressure regulating valve is feedback-controlled and thus can be kept constant. Accordingly, the primary side (an inlet side) pressure of the flow control device can be kept constant, and the gas flow rate discharged from the flow control device can also be kept constant. Consequently, in the gas flow-rate verification, the gas flow rate calculated from the pressure drop in the tank and the gas flow rate actually discharged from the flow control device coincide with each other. Thus, the accuracy of the gas flow-rate verification can be enhanced.

By the above configuration (2), it is possible to reduce variations in secondary side pressure of the pressure regulating valve in each process gas line, enabling high accurate verification of the gas flow rate discharged from the flow control device.

Specifically, since the pressure regulating valve provided in each process gas line feedback-controls the secondary side pressure of the pressure regulating valve, for example, it is possible to reliably reduce variations in secondary side pressure of the pressure regulating valve even when the gas pressure of each process gas supply source varies, the inner pressure of the tank drops, the PRV secondary side volume changes, the gas flow rate supplied from each process gas supply source varies, and so on. The secondary side pressure of the pressure regulating valve is also the primary side pressure of the flow control device (a mass flow controller and others) and thus the primary side pressure of the flow control device is stabilized. Therefore, the gas flow rate discharged from the flow control device in each process gas line and the flow rate from the tank are made stable. In each process gas line, this can reduce an error between the gas flow rate calculated from the pressure drop in the tank and the gas flow rate actually discharged from the flow control device. The measurement accuracy of the gas flow-rate verification system can be enhanced.

For instance, in one of the process gas lines, if a pipe length between the pressure regulating valve and the flow control device is changed by modifications of a semiconductor manufacturing device or another purpose, the PRV secondary side volume in the relevant process gas line is changed. When this PRV secondary side volume is changed, the secondary side pressure of the pressure regulating valve is also apt to change. However, the secondary side pressure of the pressure regulating valve is feedback-controlled and thus can be kept constant. Accordingly, the primary side pressure of the flow control device can be kept constant, and the gas flow rate discharged from the flow control device can also be kept constant. Consequently, in the gas flow-rate verification of each process gas line, the gas flow rate calculated from the pressure drop in the tank and the gas flow rate actually discharged from the flow control device coincide with each other. Thus, the accuracy of the gas flow-rate verification can be enhanced.

By the above configuration (3), the secondary side pressure of the pressure regulating valve in each process gas line can be kept constant, enabling high accurate verification of the gas flow rate discharged from the flow control device. Specifically, since the pressure regulating valve feedback-controls the secondary side pressure of the pressure regulating valve, it is possible to reduce variations in secondary side pressure of the pressure regulating valve even when the primary side pressure of the pressure regulating valve varies. In addition, the primary side pressure and the secondary side pressure of the pressure regulating valve are directly measured and pressure control is performed based on a pressure difference between those measured pressures. This can more stably maintain the secondary side pressure of the pressure regulating valve.

By the above configuration (4), the first pressure sensor can accurately measure the gas pressure in the measuring tank and also the gas flow-rate verification can be efficiently performed with less waiting time.

To be specific, the manifold is formed with flow passages separately communicating with inside of the tank to respectively connect the first pressure sensor and the pressure regulating valve to the tank. Thus, in the gas flow-rate verification, the gas in the tank is allowed to flow in the primary side passage of the pressure regulating valve without passing through the flow passage of the first pressure sensor. Accordingly, the first pressure sensor can accurately measure the pressure of gas staying in the tank without being influenced by pressure variations caused in association with a turbulent air flow generated when the gas in the tank flows out to the primary side passage of the pressure regulating valve.

The gas pressure in the tank gradually decreases, but is less influenced by gas adiabatic expansion at a measuring position of the first pressure sensor because the gas flows in the primary side passage of the pressure regulating valve without passing through the flow passage of the first pressure sensor. Accordingly, a pressure drop rate in the tank measured by the first pressure sensor can be maintained constant. Since the pressure drop rate in the tank can be kept constant from immediately after the start of gas flow-rate verification, therefore, the gas flow-rate verification can be efficiently performed without taking a waiting time.

By the above configuration (5), the tank volume can be easily changed by changing the thickness of the cover member. Thus, the tank volume can be changed according to the gas flow rate, so that an optimal pressure drop rate is obtained. Moreover, when the cover member is made thinner and/or made of a material having good thermal conductivity, it is possible to rapidly transfer heat to the gas in the tank and thus keep a gas temperature in the tank constant.

Consequently, the gas flow-rate verification can be performed more efficiently with the pressure drop rate in the tank in an optimal status according to the gas flow rate.

Operations and advantageous effects of the gas flow-rate verification unit according to the present invention will be explained.

By the above configuration (6), it is possible to reduce variations in secondary side pressure of the pressure regulating valve, enabling high accurate verification of the gas flow rate discharged from the flow control device.

Specifically, since the pressure regulating valve includes the control device for feedback-controlling the secondary side pressure of the pressure regulating valve, for example, it is possible to reliably reduce variations in secondary side pressure of the pressure regulating valve even when the gas pressure of he shared gas supply source varies, the PRV secondary side volume changes, the gas flow rate supplied from the shared gas supply source varies, and so on. The secondary side pressure of the pressure regulating valve is also the primary side pressure of the flow control device (a mass flow controller and others) and thus the primary side pressure of the flow control device is stabilized. Therefore, the gas flow rate discharged from the flow control device and the flow rate from the tank are made stable. This can reduce an error between the gas flow rate calculated from the pressure drop in the tank and the gas flow rate actually discharged from the flow control device. The measurement accuracy of the gas flow-rate verification unit can be enhanced.

For instance, if a pipe length between the pressure regulating valve and the flow control device is changed by modifications of a semiconductor manufacturing device or another purpose, the PRV secondary side volume is changed. When this PRV secondary side volume is changed, the secondary side pressure of the pressure regulating valve is also apt to change. However, the secondary side pressure of the pressure regulating valve is feedback-controlled and thus can be kept constant. Accordingly, the primary side pressure of the flow control device, corresponding to the secondary side pressure of the pressure regulating valve, can be kept constant, and therefore the gas flow rate discharged from the flow control device can also be kept constant. Consequently, in the gas flow-rate verification, the gas flow rate calculated from the pressure drop in the tank and the gas flow rate actually discharged from the flow control device coincide with each other. Thus, the accuracy of the gas flow-rate verification can be enhanced.

By the above configuration (7), it is possible to reduce variations in secondary side pressure of the pressure regulating valve in each process gas line, enabling high accurate verification of the gas flow rate discharged from the flow control device.

Specifically, since the pressure regulating valve provided in each process gas line feedback-controls the secondary side pressure of the pressure regulating valve, for example, it is possible to reliably reduce variations in secondary side pressure of the pressure regulating valve even when the gas pressure of each process gas supply source varies, the inner pressure of the tank drops, the PRV secondary side volume changes, the gas flow rate supplied from each process gas supply source varies, and so on. The secondary side pressure of the pressure regulating valve is also the primary side pressure of the flow control device (a mass flow controller and others) and thus the primary side pressure of the flow control device is also stabilized. Therefore, the gas flow rate discharged from the flow control device in each process gas line and the flow rate from the tank are made stable. In each process gas line, this can reduce an error between the gas flow rate calculated from the pressure drop in the tank and the gas flow rate actually discharged from the flow control device. The measurement accuracy of the gas flow-rate verification unit can be enhanced.

For instance, in one of the process gas lines, if a pipe length between the pressure regulating valve and the flow control device is changed by modifications of a semiconductor manufacturing device or another purpose, the PRV secondary side volume in the relevant process gas line is changed. When this PRV secondary side volume is changed, the secondary side pressure of the pressure regulating valve is also apt to change. However, the secondary side pressure of the pressure regulating valve is feedback-controlled and thus can be kept constant. Accordingly, the primary side pressure of the flow control device, corresponding to the second side pressure of the pressure regulating valve, can be kept constant, and therefore the gas flow rate discharged from the flow control device can also be kept constant. Consequently, in the gas flow-rate verification of each process gas line, the gas flow rate calculated from the pressure drop in the tank and the gas flow rate actually discharged from the flow control device coincide with each other. Thus, the accuracy of the gas flow-rate verification can be enhanced.

By the above configuration (8), the secondary side pressure of the pressure regulating valve can be maintained constant even when the primary side pressure of the pressure regulating valve varies. Specifically, since the control device of the pressure regulating valve feedback-controls the secondary side pressure of the pressure regulating valve, it is possible to reduce variations in secondary side pressure of the pressure regulating valve even when the gas pressure of the gas supply source varies. In addition, the primary side pressure and the secondary side pressure of the pressure regulating valve are directly measured and the controller performs pressure control based on a pressure difference between those measured pressures. This can more stably maintain the secondary side pressure of the pressure regulating valve.

By the above configuration (9), the first pressure sensor can accurately measure the gas pressure in the measuring tank and also the gas flow-rate verification can be efficiently performed with less waiting time.

To be specific, the manifold is formed with flow passages separately communicating with inside of the tank to respectively connect the first pressure sensor and the pressure regulating valve to the tank. Thus, in the gas flow-rate verification, the gas in the tank is allowed to flow in the primary side passage of the pressure regulating valve of the pressure regulating valve without passing through the flow passage of the first pressure sensor. Accordingly, the first pressure sensor can accurately measure the pressure of gas staying in the tank without being influenced by pressure variations caused in association with a turbulent air flow generated when the gas in the tank flows out to the primary side passage of the pressure regulating valve.

The gas pressure in the tank gradually decreases, but is less influenced by gas adiabatic expansion at a measuring position of the first pressure sensor because the gas flows in the primary side passage without passing through the flow passage of the first pressure sensor. Accordingly, a pressure drop rate in the tank to be measured by the first pressure sensor can be maintained constant. Since the pressure drop rate in the tank can be kept constant from immediately after the start of gas flow-rate verification, therefore, the gas flow-rate verification can be efficiently performed without taking a waiting time.

By the above configuration (10), the tank volume can be easily changed by changing the thickness of the cover member. Thus, the tank volume can be changed according to the gas flow rate, so that an optimal pressure drop rate is obtained. Moreover, when the cover member is made thinner and/or made of a material having good thermal conductivity, it is possible to rapidly transfer heat to the gas in the tank and thus keep a gas temperature in the tank constant.

Consequently, the gas flow-rate verification can be performed more efficiently with the pressure drop rate in the tank in an optimal status according to the gas flow rate.

MODE FOR CARRYING OUT THE INVENTION

A detailed description of a preferred embodiment of a gas flow-rate verification system and a gas flow-rate verification unit embodying the present invention will now be given referring to the accompanying drawings. Herein, components of a gas circuit and a shared gas line in the gas circuit of a first embodiment are explained first and then their operations and advantageous effects are explained. Thereafter, differences between second and third embodiments from the first embodiment will be explained together with their operations and advantageous effects.

(First Embodiment)
<Configuration of Gas Circuit>

Figure 1:
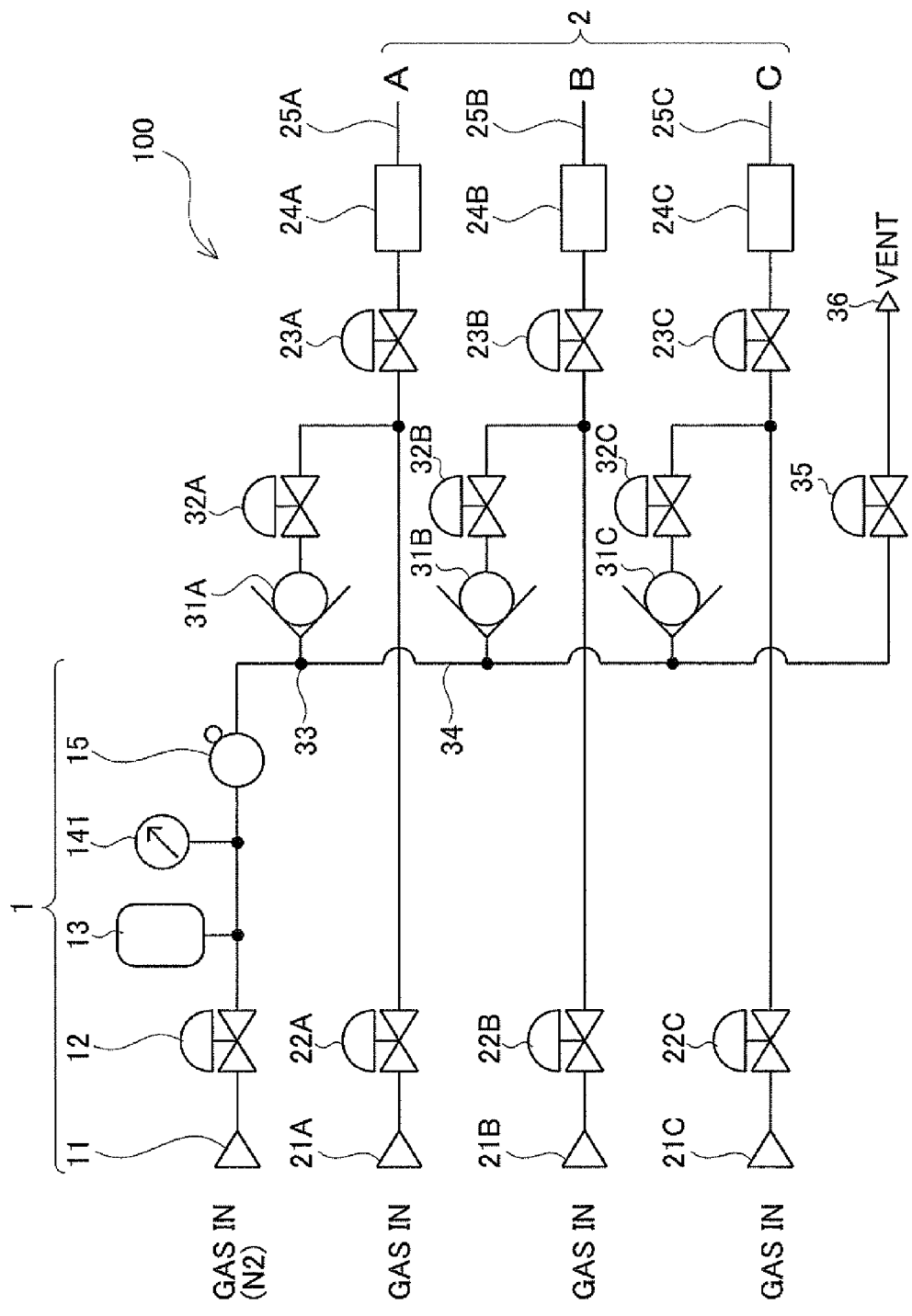
FIG. 1 is a gas circuit diagram (a main part) of a gas flow-rate verification system and a gas flow-rate verification unit of a first embodiment according to the invention.

A configuration of the gas circuit of the first embodiment will be explained first. FIG. 1 is a gas circuit diagram (a main part) of a gas flow-rate verification system and a gas flow-rate verification unit of the first embodiment according to the invention.

As shown in FIG. 1, a gas flow-rate verification system 100 includes a shared gas line 1 and a process gas line 2. The shared gas line 1 is one example of a gas flow-rate verification unit of the present embodiment.

The shared gas line 1 is a gas line provided on an upstream side of the process gas line 2 including flow control devices (a mass flow controller and others) mentioned later in order to supply gas from a shared gas supply source to process chambers of a coating or deposition device, a dry etching device, etc. in a semiconductor manufacturing process. The shared gas used herein is for example nitrogen gas. Gas pressure of the gas to be supplied is on the order of 0.4 to 0.5 MPa.

As shown in FIG. 1, in the shared gas line 1, a shared gas inlet port 11, a shared cutoff valve 12, a tank 13 for measurement, a first pressure sensor 141, a pressure regulating valve 15, and a shared gas outlet port 33 are connected in order. The inlet port 11 is a terminal in which gas from the shared-gas supply source not shown is inputted. The cutoff valve 12 is an air-operated valve to supply or stop the gas from the inlet port 11 to a downstream side. The tank 13 is a vessel or container for storing a constant amount of gas. The volume of the tank 13 is determined to be optimal based on a flow rate of the flow control devices (the mass flow controller and others), for example, it is on the order of 50 cc to 60 cc. At the time of gas flow-rate verification, the gas staying in the tank 13 flows outside and thus gas pressure drops. The first pressure sensor 141 is a pressure gage for measuring the pressure drop of gas staying in the tank 13. This pressure gage used herein is a strain-gage-type pressure gage capable of measuring high pressure gas. The pressure regulating valve 15 is a control valve to maintain the pressure of gas to be supplied to the flow control devices (the mass flow controller and others) to a constant level. The pressure regulating valve 15 feedback-controls a secondary side pressure to reduce variations in the secondary side pressure. For the feedback control, there are a mechanical feedback method using a returning flow passage provided in a pressure control chamber of the pressure regulating valve 15 and an electric feedback method using a signal representing a secondary side pressure. The first embodiment uses the mechanical feedback method. A set pressure of the pressure regulating valve 15 is determined to be lower than the pressure of the gas to be supplied from the shared gas supply source. This pressure of the gas supplied from the shared gas supply source is on the order of 0.4 to 0.5 MPa, and thus the set pressure of the pressure regulating valve 15 is about 0.2 MPa. The shared gas outlet port 33 is a terminal from which the gas from the pressure regulating valve 15 is outputted to the process gas line 2 mentioned later.

As shown in FIG. 1, the process gas line 2 consists of a plurality of gas lines A, B, and C arranged in parallel in order to supply process gas to each process chamber of a coating or deposition device, a dry etching device, and others in a semiconductor manufacturing process not shown. The gas lines A, B, and C of the process gas line 2 are branched off from the shared gas line 1. To be concrete, each gas line A, B, and C is branched after passing through the shared gas outlet port 33 and a branch pipe 34. In each branching connection line, a check valve 31A, 31B, or 31C and a cutoff valve 32A, 32B, or 32C are placed. In the gas lines A, B, and C, respectively, process gas inlet ports 21A, 21B, and 21C, first line cutoff valves 22A, 22B, and 22C, second line cutoff valves 23A, 23B, and 23C, and flow control devices 24A, 24B, and 24C are connected, from an upstream side. The branching connection lines are connected respectively to points between the first line cutoff valves 22A, 22B, and 22C and the second line cutoff valves 23A, 23B, and 23C.

The check valves 31A, 31B, and 31C are valves for preventing backflow of process gas from their corresponding gas lines A, B, and C. The cutoff valves 32A, 32B, 32C are air-operated valves for supplying or blocking the gas from the shared gas line 1 to the gas lines A, B, and C, respectively. The process gas inlet ports 21A, 21B, and 21C are terminals in which the gas from the process gas supply source not shown is inputted. Examples of the process gas used herein are special gases such as silane, corrosive gasses such as chlorine gas, combustible gasses such as hydrogen gas and phosphine gas, and so on. In the present embodiment, the gas pressure of the process gas to be supplied is on the order of 0.4 to 0.5 MPa. The first line cutoff valves 22A, 22B, and 22C and the second line cutoff valves 23A, 23B, and 23C are air-operated valves for supplying or stopping the process gas respectively to the flow control devices 24A, 24B, and 24C. The flow control devices 24A, 24B, and 24C are for example mass flow controllers each including a mass flow meter and a control valve in combination to perform feedback control to control flow rate. Accordingly, the flow control devices 24A, 24B, and 24C can stably discharge the gas at a flow rate set to a predetermined value. The gas discharged from the flow control devices 24A, 24B, and 24C are supplied respectively to process chambers through supply pipes 25A, 25B, and 25C.

The branch pipe 34 is connected to a discharge valve 35 and a discharge terminal 36 to discharge unnecessary gas to the outside.

<Parts Configuration of Shared Gas Line (Gas Flow-Rate Verification Unit)>

Figure 2:
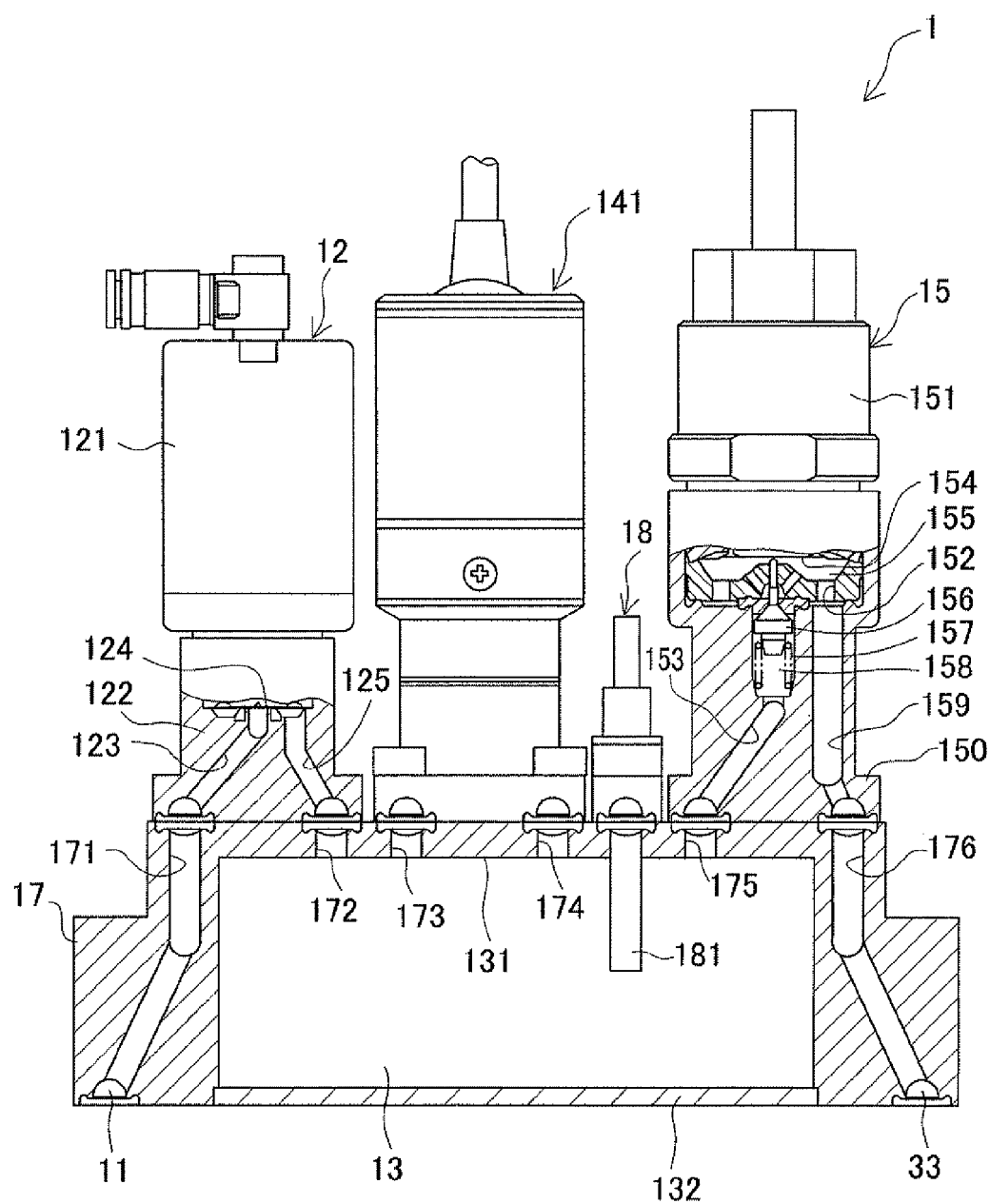
FIG. 2 is a configuration view of components of a shared gas line (a gas flow-rate verification unit) in the gas circuit shown in FIG. 1.

Configuration of parts or components constituting the shared gas line 1 of the first embodiment will be explained below. FIG. 2 is a configuration view of parts or components constituting the shared gas line in the gas circuit shown in FIG. 1.

As shown in FIG. 2, in the order from a left side in the figure, the shared cutoff valve 12, the first pressure sensor 141, a thermometer 18, and the pressure regulating valve 15 are placed on an upper end of a manifold 17. The manifold 17 has a substantially rectangular shape and is internally formed with the tank 13 for measurement having a rectangular cross section. In an upper end wall of the tank 13 (i.e., the manifold 17) in the rectangular cross section, there are formed a flow passage 172 communicating with a secondary side (outlet side) passage 125 of the shared cutoff valve 12, flow passages 173 and 174 communicating with the first pressure sensor 141, and a flow passage 175 communicating with a primary side (inlet side) passage 153 of the pressure regulating valve 15 so that those passages are vertically formed to open in an inner surface 131 of the upper end wall of the tank 13 and spaced apart from each other. A sensor piece 181 of the thermometer 18 protrudes downward from the inner surface 131 of the upper end wall defining the tank 13. In a lower end portion of the manifold 17, a plate-like cover member 132 is fixed to seal the tank 13. In a left end portion of the manifold 17 in the figure, a flow passage 171 is formed to provide communication between the shared gas inlet port 11 formed in the lower end and a primary side passage 123 of the shared cutoff valve 12. In a right end portion of the manifold 171 in the figure, a flow passage 176 is formed to provide communication between the outlet port 33 formed in the lower end and a secondary side passage 159 of the pressure regulating valve 15.

The shared cutoff valve 12 includes a drive part 121 and a main body 122. The drive part is air-operated to move a diaphragm 124 up and down to supply and stop the shared gas. The first pressure sensor 141 directly measures the pressure of the shared gas in the tank 13 from the flow passages 173 and 174 communicating with a sensor part not shown.

The thermometer 18 measures the temperature of the shared gas in the tank. Since the sensor piece 181 is placed to protrude downward from the inner surface of the upper end wall of the tank 13 having the rectangular cross section, the temperature of the shared gas in the tank 13 can be measured more accurately. By measuring the temperature of the shared gas in the tank 13, temperature variation of the shared gas at the time of gas flow-rate verification is checked and reflected in calculation of the flow rate.

The pressure regulating valve 15 includes an adjustment mechanism part 151 and a body part 150. The set pressure of the pressure regulating valve 15 is adjusted by an adjustment mechanism not shown of the adjustment mechanism part 151. The adjustment mechanism is configured to adjust an urging force of an adjustment spring not shown to thereby move a diaphragm 154 up and down. The diaphragm 154 is placed in an upper end of a pressure control chamber 155 to cover the pressure control chamber 155. A protruding portion of a poppet valve element 156 protrudes into the pressure control chamber 155 from below to come into and out of contact with the diaphragm 154. The poppet valve element 156 is housed in a valve chamber 158 communicating with the primary side passage 153 and urged upward by a compression spring 157. In a lower end of the pressure control chamber 155, a returning passage 152 is formed to communicate with a secondary side passage 159. Accordingly, the secondary side pressure of the pressure regulating valve 15 is fed back to the pressure control chamber 155 via the returning passage 152.

<Explanation of Operations>

Figure 3:
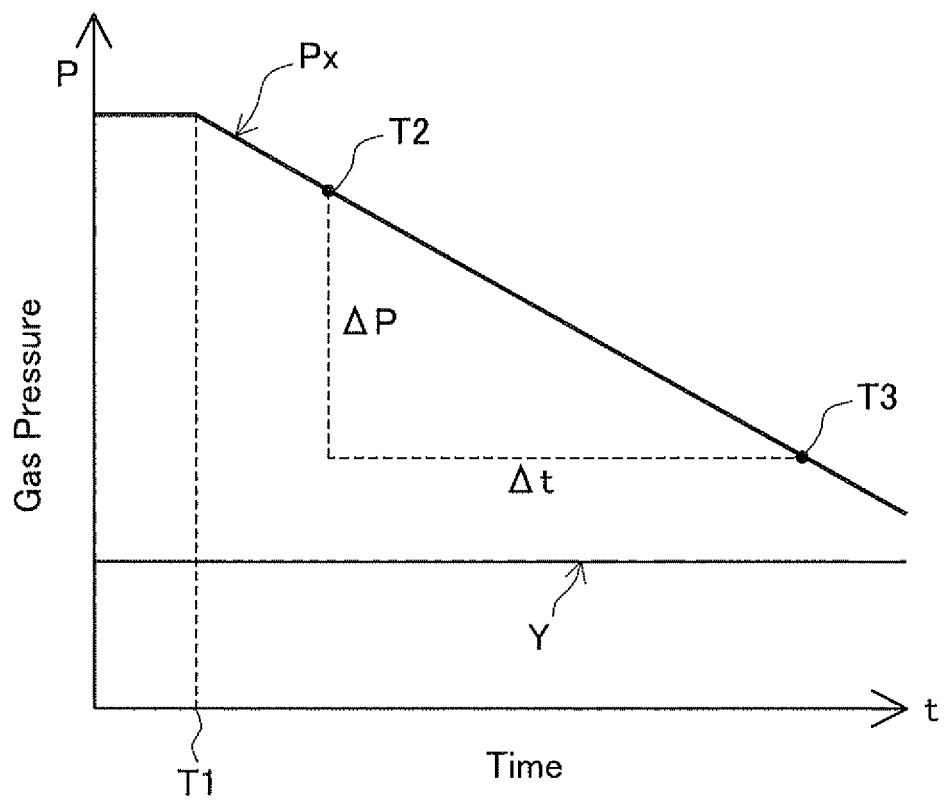
FIG. 3 is a graph of pressure lines at the time of gas flow-rate verification.

Operations of the gas flow-rate verification system and the gas flow-rate verification unit of the first embodiment will be explained below referring to FIGS. 1, 2, and 3. FIG. 3 is a graph showing pressure lines in the measuring tank 13 at the time of gas flow-rate verification.

In the gas circuit shown in FIG. 1, nitrogen gas of 0.5 MPa for example is supplied from the shared gas supply source to the shared gas inlet port 11. The secondary side pressure of the pressure regulating valve 15 is set to 0.2 MPa for example. Then, the shared cutoff valve 12 is opened and, for example, the second line cutoff valve 23A of the gas line A to be subjected to the flow rate verification and the connecting cutoff valve 32A of the branching connection line connected to the gas line A are opened. At that time, the first line cutoff valve 22A of the gas line A, the first line cutoff valves 22B and 22C, the second line cutoff valves 23B and 23C, and the connecting cutoff valves 32B and 32C of other gas lines B and C are closed. The discharge valve 35 is also closed.

The shared gas passes through the shared cutoff valve 12 and then the gas pressure is reduced from 0.5 MPa to 0.2 MPa in the pressure regulating valve 15. Accordingly, the primary side pressure of the flow control device 24A is also 0.2 MPa. The gas flows at the flow rate set in the flow control device 24A into the gas line A and is supplied to a predetermined process chamber via the supply pipe 25A.

When the flow rate of shared gas discharged from the flow control device 24A becomes stable, the shared cutoff valve 12 is closed. When the cutoff valve 12 is closed, gas supply from the shared gas supply source is blocked. Thus, the gas stored in the tank 13 is released into the shared gas line 1 and allowed to flow in the gas line A via the branching connection line and discharged from the flow control device 24A toward the process chamber.

As shown in FIG. 3, the gas pressure (Px) in the tank 13 decreases from a valve closing time (T1) of the shared cutoff valve 12. At a stage in which a gas pressure drop rate per unit of time becomes stably constant (a measurement start time T2), the first pressure sensor 141 measures gas pressure. After a fixed time has elapsed (at a measurement end time T3), the first pressure sensor 141 then measures gas pressure again. In this case, the gas pressure in the tank 13 at the measurement end time has to be higher than the secondary side pressure (Y) of the pressure regulating valve 15. This is because if the gas pressure in the tank 13 drops below the secondary side pressure of the pressure regulating valve 15, the secondary side pressure of the pressure regulating valve 15 also decreases together with the gas pressure in the tank 13.

Next, the gas pressure in the tank 13 at the measurement start time (T2), a difference $\Delta P$ from the gas pressure at the measurement end time (T3), and a time $\Delta t$ from the measurement start time to the measurement end time are determined. A value of $\Delta P/\Delta t$ is proportional to a gas flow rate. This value is therefore multiplied by a proportionality coefficient to calculate a gas flow rate to be discharged from the flow control device 24A toward the process chamber. In comparison between the calculated gas flow rate and a gas flow rate set in the flow control device 24A, if a difference is within a reference value, a flow rate verification result is successful. This flow rate verification may be repeated several times to check repeatability.

Figure 5:
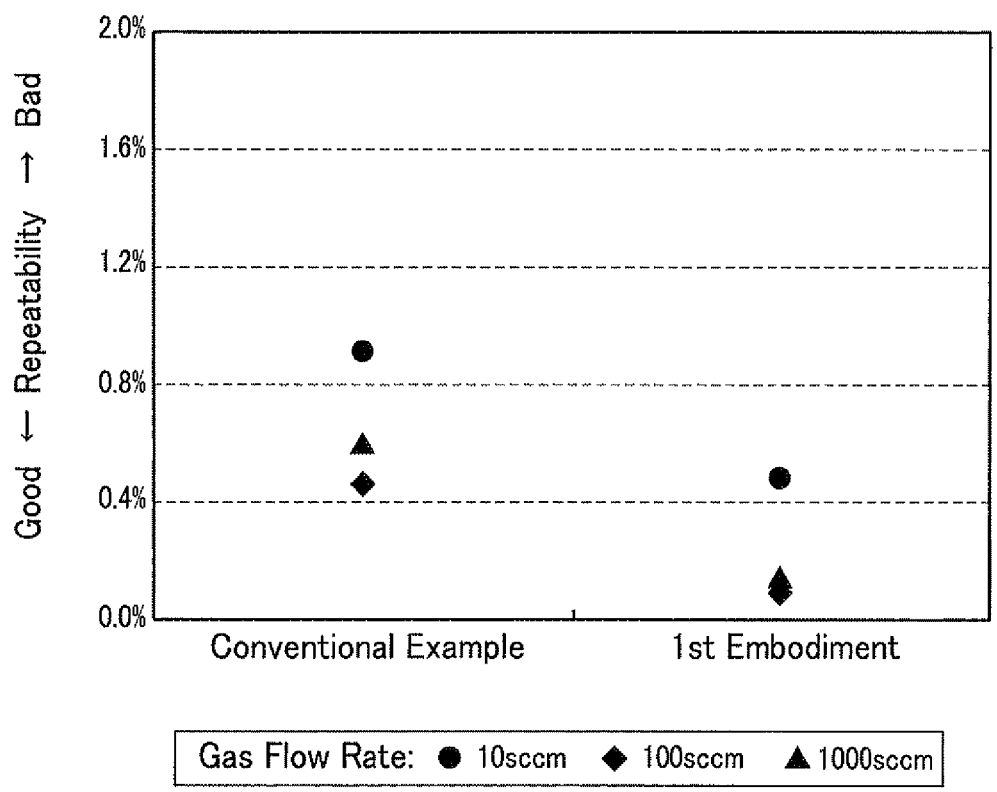
FIG. 5 is a graph showing repeatability in the gas flow-rate verification system and the gas flow-rate verification unit of the first embodiment.

FIG. 5 is a graph showing the repeatability in the gas flow-rate verification system and the gas flow-rate verification unit of the first embodiment. As shown in FIG. 5, the flow rate was changed in three stages; 10 sccm, 100 sccm, and 1000 sccm, and the gas flow-rate verification was repeated several times and variations in calculated gas flow rate were measured. A smaller variation corresponds to better repeatability. A smaller gas flow rate (e.g., 10 sccm) provides a larger variation. However, the variation in the gas flow-rate verification system of the present embodiment is half or less as compared with the variation in a conventional example.

As a result of the comparison between the calculated gas flow rate and the gas flow rate set in the flow control device 24A, if a difference between them is a reference value or more, the set value of the flow control device 24A is corrected. As an alternative, the flow control device 24A may be judged to be failed and replaced with new one. Other gas lines B and C can similarly subjected to the gas flow-rate verification.

As shown in FIG. 3, the secondary side pressure (Y) of the pressure regulating valve 15 needs to be kept constant. However, as mentioned above, if the pipe length between the pressure regulating valve 15 and the flow control device 24A or others is changed by, for example, modifications of a semiconductor manufacturing device and others, a secondary side volume of the pressure regulating valve 15 ("PRV secondary side volume") is changed. When the PRV secondary side volume is changed, the secondary side pressure of the pressure regulating valve 15 is also changed. It is to be noted that the secondary side pressure of the pressure regulating valve 15 is also changed in association with the pressure drop in the tank 13.

In the first embodiment, therefore, the secondary side pressure of the pressure regulating valve 15 is feedback controlled to be kept constant.

The feedback control method is explained referring to FIG. 2. For instance, in the case where the secondary side pressure of the pressure regulating valve 15 is lower than a set pressure, the pressure of the pressure control chamber 155 becomes lower than the set pressure, thereby deforming the diaphragm 154 downward, pushing down the poppet valve element 156. Thus, the valve opening degree of the poppet vale element 156 in the valve chamber 158 is opened, allowing a larger amount of gas to flow from the valve chamber 158 to the pressure control chamber 155, thereby increasing the pressure in the pressure control chamber 155. As the pressure in the pressure control chamber 155 increases, the secondary side pressure of the pressure regulating valve 15 is increased via the returning passage 152.

Since the secondary side pressure of the pressure regulating valve 15 is feedback-controlled as above, the secondary side pressure of the pressure regulating valve 15 can be continuously kept constant. Consequently, the flow rate verification can be performed with high repeatability and less errors.

<Operations and Advantageous Effects>

According to the gas flow-rate verification system 100 and the gas flow-rate verification unit 1 of the present embodiment, as explained above in detail, it is possible to reduce the variations in secondary side pressure of the pressure regulating valve 15 and verify the gas flow rate to be supplied from each of the flow control devices 24A, 24B, and 24C with high accuracy.

To be concrete, the secondary side pressure of the pressure regulating valve 15 is feedback controlled, so that the pressure regulating valve 15 can reliably reduce the variation in secondary side pressure even when the gas pressure of the shared gas supply source varies, the PRV secondary side volume changes, the gas flow rate supplied from the shared gas supply source varies, and so on. The secondary side pressure of the pressure regulating valve 15 is also the primary side pressure of each of the flow control devices (the mass flow controllers and others) 24A, 24B, and 24C. Thus, the primary side pressure of the flow control device 24A, 24B, or 24C are stabilized. Therefore, the flow rate of gas discharged from the flow control device 24A, 24B, or 24C and the amount of gas flowing out of the tank 13 become stable. This can reduce a difference between the gas flow rate calculated based on the pressure drop in the measuring tank 13 and the gas flow rate actually discharged from the flow control device 24A, 24B, or 24C, and enhance the measurement accuracy of the gas flow-rate verification system 100 and the gas flow-rate verification unit 1.

For instance, when the pipe length between the pressure regulating valve 15 and the flow control devices 24A, 24B, and 24C is changed by, for example, modifications of a semiconductor manufacturing device, the PRV secondary side volume is changed. When this PRV secondary side volume is changed, the secondary side pressure of the pressure regulating valve 15 is apt to change. However, the secondary side pressure of the pressure regulating valve 15 is feedback-controlled and thus can be kept constant. Accordingly, the primary side pressure of the flow control device 24A, 24B, or 24C can be maintained constant, so that the gas flow rate discharged from this flow control device 24A, 2413, or 24C can also be kept constant. Accordingly, the gas flow rate calculated from the pressure drop in the measuring tank 13 and the gas flow rate actually discharged from the relevant flow control device 24A, 24B, or 24C coincide with each other at the time of the gas flow-rate verification. The verification accuracy of gas flow rate can be enhanced.

In the present embodiment, the measuring tank 13 is provided in the manifold 17 on the top end of which the shared cutoff valve 12, the first pressure sensor 141, and the pressure regulating valve 15 are placed. The flow passages 173 and 174 that connect the first pressure sensor 141 to the tank 13 and the flow passage 175 that connects the pressure regulating valve 15 to the tank 13 are formed in the upper end wall of the tank 13 (the manifold 17) to open in the inner surface 131, thus separately communicating with the inside of the tank 13. The first pressure sensor 141 can accurately measure the gas pressure in the tank 13 and also efficient gas flow-rate verification with less waiting time can be realized.

To be specific, the flow passages 173 and 174 providing communication between the first pressure sensor 141 and the tank 13 and the flow passage 175 providing communication between the pressure regulating valve 15 and the tank 13 are formed through the upper end wall of the tank 13 at different spaced positions. During the gas flow-rate verification, the process gas in the tank 13 is allowed to flow to the primary side passage 153 of the pressure regulating valve 15 via the flow passage 175 without passing through the flow passages 173 and 174 of the first pressure sensor 141. Therefore, the first pressure sensor 141 is less influenced by pressure variations caused in association with a turbulent air flow generated when the gas in the tank 13 flows out to the flow passage 175 and the primary side passage 153 of the pressure regulating valve 15. As a result, the pressure of gas staying in the tank 13 can be measured accurately.

Figure 4:
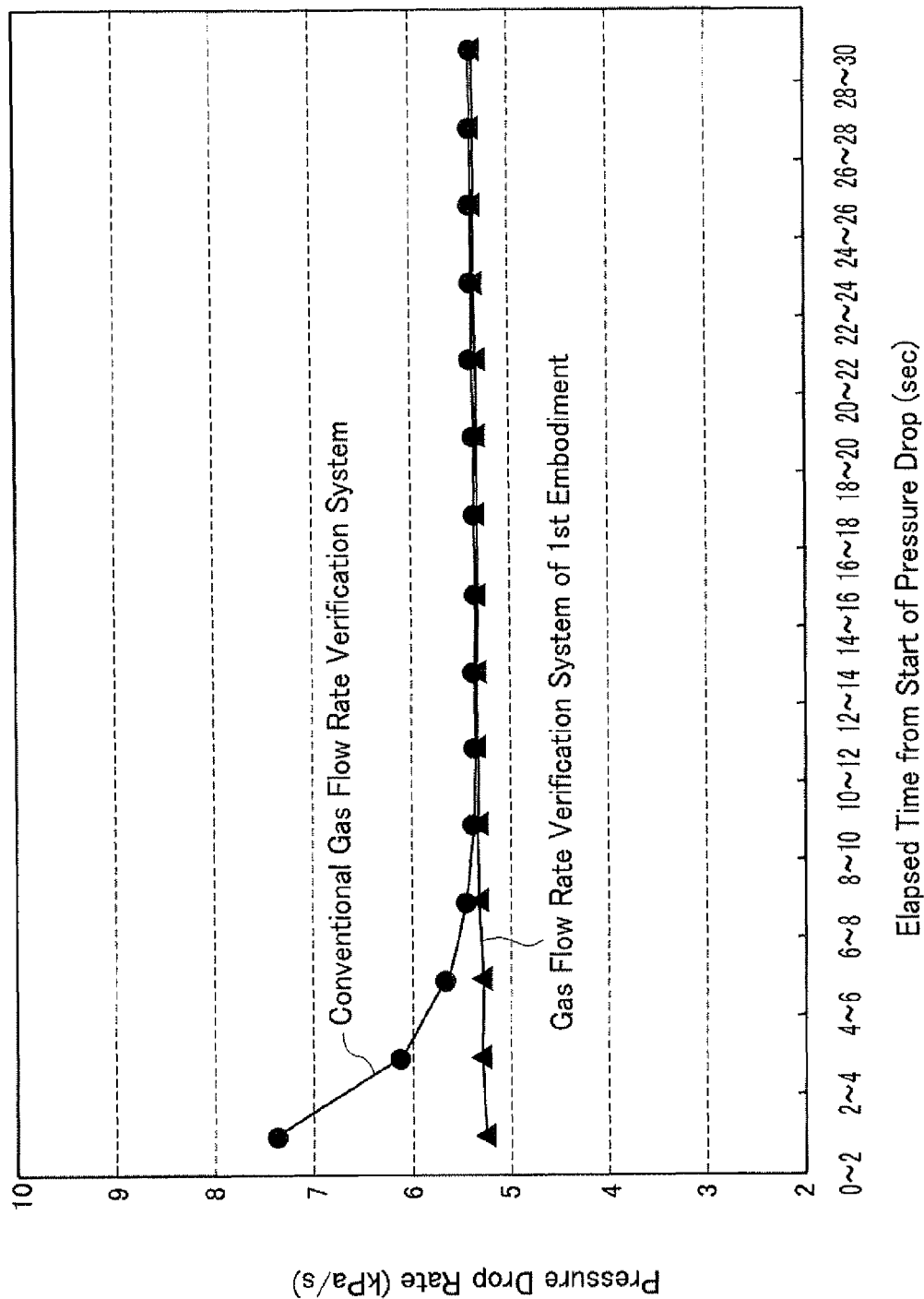
FIG. 4 is a graph showing pressure drop rates in a measuring tank of the gas flow-rate verification system and the gas flow-rate verification unit of the first embodiment and in a measuring tank of a conventional example.

The gas pressure in the measuring tank 13 gradually decreases, but is less influenced by gas adiabatic expansion at a measuring position of the first pressure sensor 141 because the gas flows in the primary side passage 153 of the pressure regulating valve 15 without passing through the flow passages 173 and 174 of the first pressure sensor 141. Accordingly, the pressure drop rate in the tank 13 to be measured by the first pressure sensor 141 can be stabilized. Since the pressure drop rate in the tank 13 can be kept constant from immediately after the start of gas flow-rate verification, therefore, the gas flow-rate verification can be efficiently performed without taking a waiting time (see FIG. 4).

In the present embodiment, the lower end of the manifold 17 is provided with the cover member 132 for sealingly closing the lower end of the tank 13. By changing the thickness of the cover member 132, therefore, a tank volume can be easily changed. Thus, the tank volume can be changed according to the gas flow rate, so that an optimal pressure drop rate is obtained. Moreover, the cover member 132 may be made thinner and/or made of a material having good thermal conductivity. It is therefore possible to rapidly transfer heat to the gas in the tank 13 and thus keep a gas temperature in the tank 13 constant.

Consequently, the gas flow-rate verification can be performed more efficiently with the pressure drop rate in the tank 13 in an optimal status according to the gas flow rate.

(Second Embodiment)
<Configuration of Gas Circuit>

Figure 6:
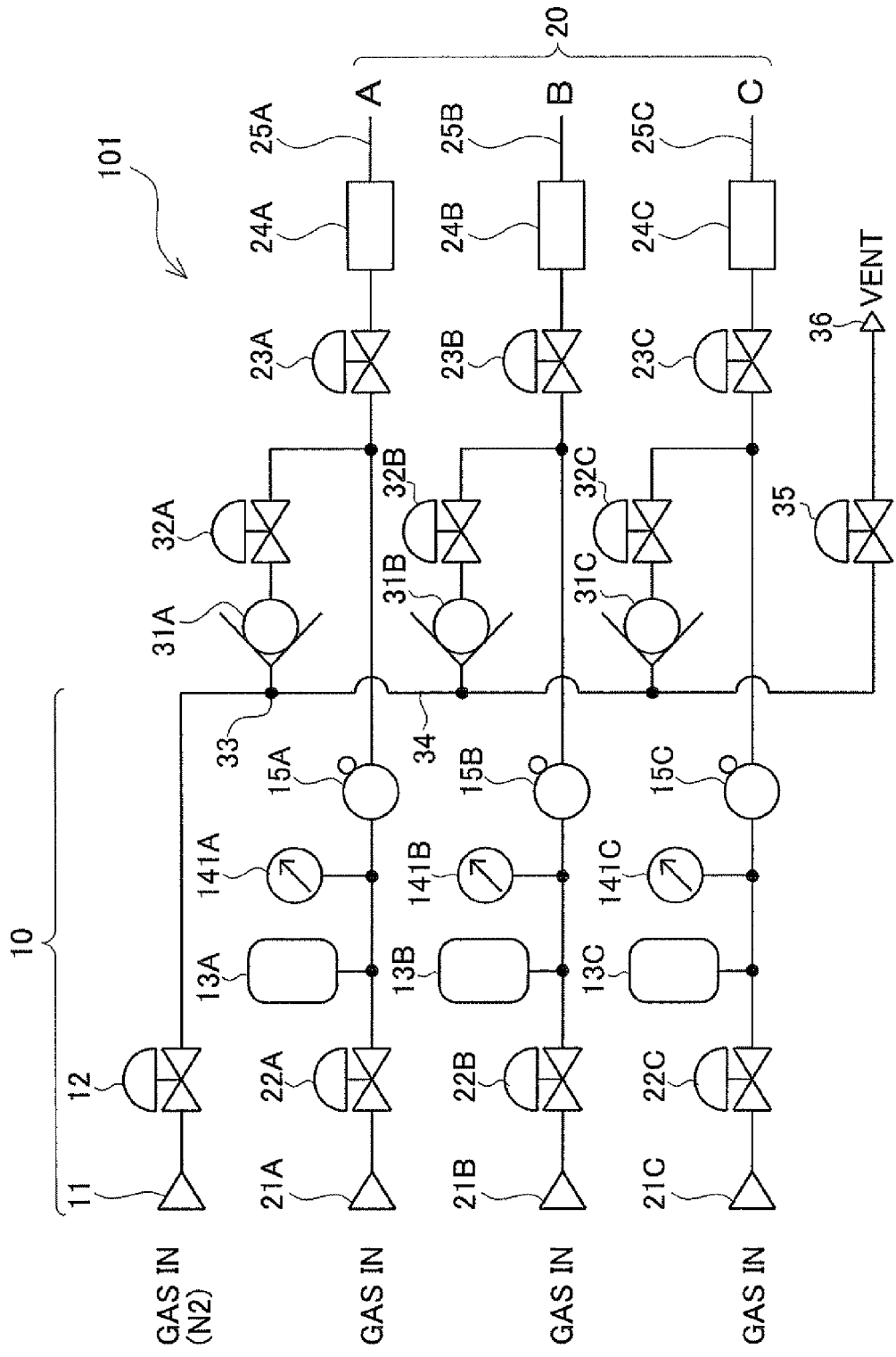
FIG. 6 is a gas circuit diagram (a main part) of the gas flow-rate verification system and the gas flow-rate verification unit of a second embodiment according to the invention.

A gas circuit configuration in a second embodiment will be explained below. FIG. 6 is a gas circuit diagram (a main part) of a gas flow-rate verification system and a gas flow-rate verification unit of the second embodiment according to the present invention.

In the present embodiment, as shown in FIG. 6, measuring tanks 13A, 13B, and 13C, first pressure sensors 141A, 141B, and 141C, and pressure regulating valves 15A, 15B, and 15C are provided between first line cutoff valves 22A, 22B, and 22C and second line cutoff valves 23A, 23B, and 23C in the gas lines A, B, and C of a process gas line 20, and a shared gas line 10 includes the shared cutoff valve 12. Other circuit configurations are identical to those in the first embodiment. Thus, similar or identical parts to those in the first embodiment are given the same reference signs as those in the first embodiment and their details are not explained herein.

A gas flow-rate verification system 101 includes the shared gas line 10 and the process gas line 20 as shown in FIG. 6. In the shared gas line 10, the shared inlet port 11 and the shared cutoff valve 12 are connected in order.

In the gas lines A, B, and C of the process gas line 20, respectively, the measuring tanks 13A, 13B, and 13C, the first pressure sensors 141A, 141B, and 141C, and the pressure regulating valves 15A, 15B, and 15C are connected in order between the first line cutoff valves 22A, 22B, and 22C and the second line cutoff valves 23A, 23B, and 23C.

In the present embodiment, the gas flow-rate verification unit corresponding to a gas circuit in which the first line cutoff valves 22A, 22B, and 22C, the measuring tanks 13A, 13B, and 13C, the first pressure sensors 141A, 141B, and 141C, and the pressure regulating valves 15A, 15B, and 15C are connected in sequence. The gas flow-rate verification unit is therefore placed in each of the gas lines A, B, and C.

The gas flow-rate verification units are provided individually in the gas lines A, B, and C, so that the gas flow-rate verification is performed separately for each process gas supplied to the gas lines A, B, and C. Accordingly, according to kind, gas pressure, gas flow rate, etc. of the process gases, the specifications of the tanks 13A, 13B, and 13C, the first pressure sensors 141A, 141B, and 141C, and the pressure regulating valves 15A, 15B, and 15C may be changed by gas line.

The gas (e.g., nitrogen gas) from the shared gas line 10 does not contribute to the gas flow-rate verification. Therefore, the shared cutoff valve 12 is normally closed. This valve 12 is opened when purge gas is to be supplied to each gas line A, B, and C for periodic inspection, for example.

<Explanation of Operations>

Next, operations of the gas flow-rate verification system and the gas flow-rate verification unit of the second embodiment will be explained referring to FIG. 6.

In the gas circuit shown in FIG. 6, a process gas of 0.5 MPa for example is supplied from the process gas supply source to the process gas inlet ports 21A, 21B, and 21C. The secondary side pressure of the pressure regulating valves 15A, 15B, and 15C are set to 0.2 MPa, for example. Thereafter, for example, the first line cutoff valve 22A and the second line cutoff valve 23A of the gas line A to be subjected to the gas flow-rate verification are opened. At that time, the shared cutoff valve 12 of the shared gas line 10, the cutoff valve 32A, and the first line cutoff valves 22B and 22C, the second line cutoff valves 23B and 23C, and the connecting cutoff valves 32B and 32C of other gas lines B and C are closed. The discharge valve 35 is also closed.

The process gas in the gas line A passes through the first line cutoff valve 22A and then the gas pressure is reduced from 0.5 MPa to 0.2 MPa in the pressure regulating valve 15A. Accordingly, the primary side pressure of the flow control device 24A is also 0.2 MPa. The flow rate set in the flow control device 24A flows through the gas line A and is supplied to a predetermined process chamber via the supply pipe 25A.

When the flow rate of process gas discharged from the flow control device 24A becomes stably constant, the first line cutoff valve 22A is closed. When this valve 22A is closed, blocking supply of gas from the process gas supply source, the gas stored in the tank 13 is released into the gas line A and then discharged to the process chamber via the flow control device 24A.

Similar to the first embodiment, the gas pressure in the tank 13A decreases from a valve closing time of the first line cutoff valve 22A. At a stage in which the pressure drop rate of gas pressure per unit of time becomes stably constant (a measurement start time), the first pressure sensor 141A measures the gas pressure. After a fixed time has elapsed (at a measurement end time), the first pressure sensor 141A measures the gas pressure again. In this case, the gas pressure in the tank 13A at the measurement end time needs to be higher than the secondary side pressure of the pressure regulating valve 15A. This is because if the gas pressure in the tank 13A drops below the secondary side pressure of the pressure regulating valve 15A, the secondary side pressure of the pressure regulating valve 15A also decreases together with the gas pressure in the tank 13A.

Similar to the first embodiment, the gas pressure in the tank 13A at the measurement start time, a difference $\Delta P$ from the gas pressure at the measurement end time, and a time $\Delta t$ from the measurement start time to the measurement end time are determined. A value of $\Delta P/\Delta t$ is proportional to a gas flow rate. This value is therefore multiplied by a proportionality coefficient to calculate a gas flow rate to be discharged from the flow control device 24A toward the process chamber. In comparison between the calculated gas flow rate and a gas flow rate set in the flow control device 24A, if a difference is within a reference value, a flow rate verification result is successful. This flow rate verification may be repeated several times to check repeatability. It is to be noted that other gas lines B and C may also be subjected to the gas flow-rate verification in the same manner as above.

<Operations and Advantageous Effects>

According to the gas flow-rate verification system 101 and the gas flow-rate verification unit of the second embodiment explained in detail above, it is possible to reduce variations in secondary side pressure of the pressure regulating valve 15A, 15B, or 15C in the gas line A, B, or C, and verify the gas flow rate discharged from the flow control device 24A, 24B, or 24C with high accuracy.

To be specific, the secondary side pressure of the pressure regulating valve 15A, 15B, or 15C in the gas lines A, B, or C is feedback controlled, so that the pressure regulating valve 15A, 15B, or 15C can reliably reduce the variations in secondary side pressure even when the gas pressure of the shared gas supply source varies, the secondary side volume of the pressure regulating valve changes, the gas flow rate supplied from the shared gas supply source varies, and so on. The secondary side pressures of the pressure regulating valves 15A, 15B, and 15C are also respectively the primary side pressures of the flow control devices (the mass flow controller and others) 24A, 24B, and 24C. Thus, the primary side pressures of the flow control devices 24A, 24B, and 24C are stabilized. Therefore, the gas flow rate discharged from the flow control device 24A, 24B, or 24C and the amount of gas flowing out of the tank 13A, 13B, or 13C become stable. This can reduce a difference between the gas flow rate calculated based on the pressure drop in the measuring tank 13A, 13B, or 13C and the gas flow rate actually discharged from the flow control device 24A, 24B, or 24C, and enhance the measurement accuracy of the gas flow-rate verification system.

For instance, in one of the process gas lines, when the pipe length between the pressure regulating valve and the flow control device is changed by modifications or the like of a semiconductor manufacturing device, the PRV secondary side volume is changed. When this PRV secondary side volume is changed, the secondary side pressure of the pressure regulating valve 15A, 15B, or 15C is apt to change. However, the secondary side pressure of the pressure regulating valve 15A, 15B, or 15C is feedback-controlled and thus can be kept constant. Accordingly, the primary side pressure of the flow control device 24A, 24B, or 24C can be maintained constant, therefore, the gas flow rate discharged from this flow control device 24A, 24B, or 24C can also be kept constant. Accordingly, the gas flow rate calculated from the pressure drop in the measuring tank 13A, 13B, or 13C and the gas flow rate actually discharged from the relevant flow control device 24A, 24B, or 24C coincide with each other at the gas flow-rate verification. The verification of gas flow-rate verification can be enhanced.

In the present embodiment, the gas circuits respectively constituting the gas flow-rate verification units and including the first line cutoff valves 22A, 22B, and 22C, the measuring tanks 13A, 13B, and 13C, the first pressure sensors 141A, 141B, and 141C, and the pressure regulating valves 15A, 15B, and 15C, arranged in turn, are placed in the gas lines A, B, and C individually. The gas flow-rate verification can be performed while supplying the process gas to the gas line A, B, and C.

In the gas line A, for example, when the first line cutoff valve 22A is shut down, the gas pressure in the tank 13A decreases from the valve closing time of the first line cutoff valve 22A. At a stage in which the pressure drop rate of gas pressure per unit of time becomes stably constant (a measurement start time), the first pressure sensor 141A measures the gas pressure. After a fixed time has elapsed (at a measurement end time), the first pressure sensor 141A measures the gas pressure again. In this case, the gas pressure in the tank 13A at the measurement end time is higher than the secondary side pressure of the pressure regulating valve 15A, so that a predetermined flow rate from the flow control device 24A is maintained. The first line cutoff valve 22A is opened immediately after the end of measurement, allowing the gas supplied from the process gas supply source to flow in the gas line A while keeping the gas pressure in the tank 13A higher than the secondary side pressure of the pressure regulating valve 15A. Accordingly, the flow rate of the flow control device 24A remains unchanged. As a result, the gas flow-rate verification can be performed while supplying the process gas to the gas line A.

In the present embodiment, the gas lines A, B, and C respectively include the measuring tanks 13A, 13B, and 13C, the first pressure sensors 141A, 141B, and 141C, and the pressure regulating valves 15A, 15B, and 15C. Those lines are not affected by malfunctions of the check valves 31A, 31B, and 31C provided in the branching connection lines between the gas lines A, B, and C and the shared gas line 10.

(Third Embodiment)

<Configuration of Gas Circuit>

Figure 7:
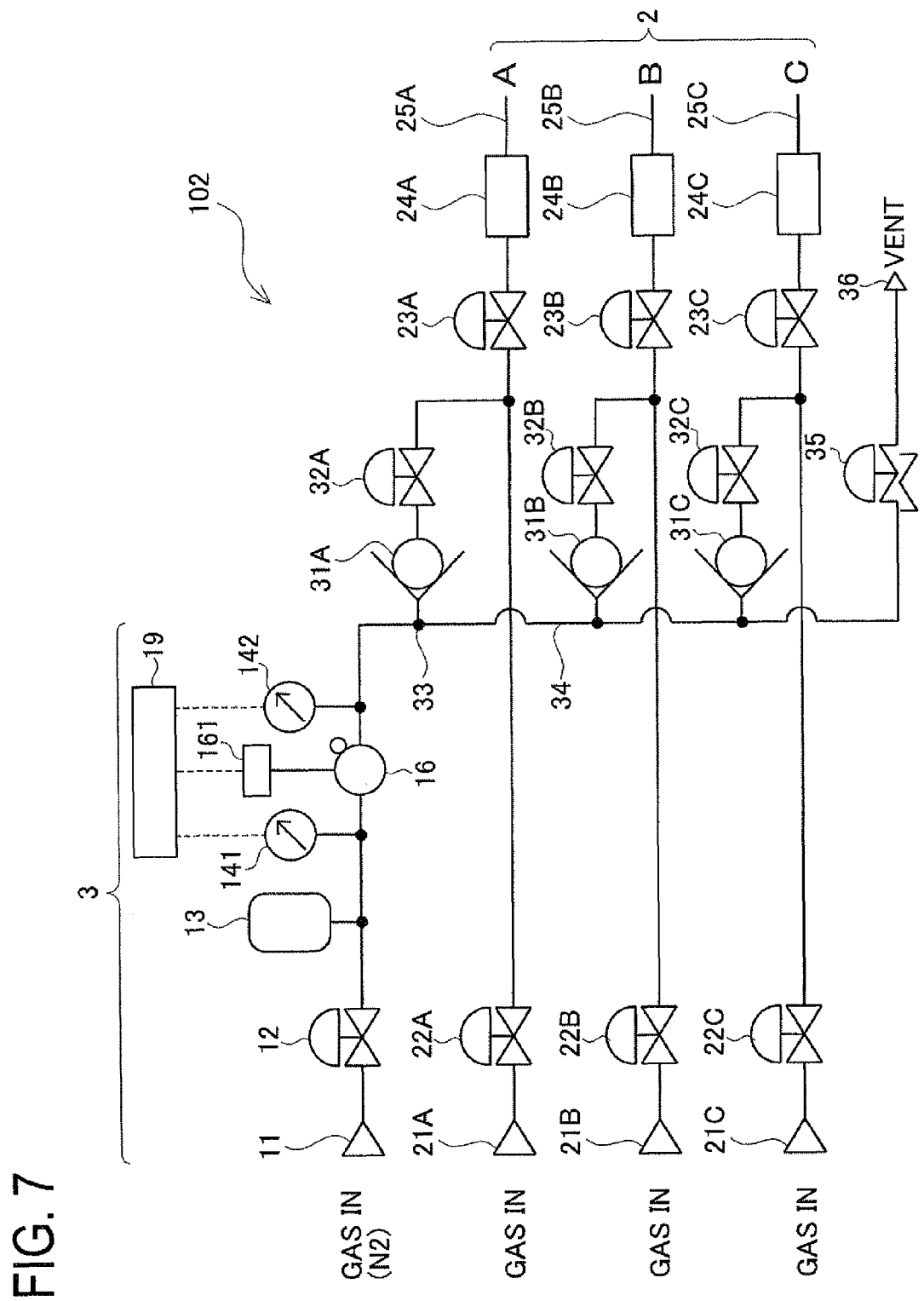
FIG. 7 is a gas circuit diagram (a main part) of the gas flow-rate verification system and the gas flow-rate verification unit of a third embodiment according to the invention.

A gas circuit configuration of a third embodiment will be explained below. FIG. 7 is a gas circuit diagram (a main part) of a gas flow-rate verification system and a gas flow-rate verification unit of the third embodiment according to the present invention.

In the present embodiment, as shown in FIG. 7, in a pressure regulating valve 16 or downstream of the pressure regulating valve 16, there is provided a second pressure sensor 142 for measuring the secondary side pressure of the pressure regulating valve 16. The pressure regulating valve 16 is connected to a controller 19 for controlling pressure based on a pressure difference between a first pressure signal from the first pressure sensor 141 and a second pressure signal from the second pressure sensor 142. Other circuit configurations are identical to those in the first embodiment. Therefore, similar or identical parts to those in the first embodiment are given the same reference signs as those in the first embodiment and their details are not explained herein.

A gas flow-rate verification system 102 includes a shared gas line 3 and the process gas line 2 as shown in FIG. 7. The shared gas line 3 is one example of the gas flow-rate verification unit of the present embodiment.

In the shared gas line 3, there are sequentially connected the shared gas inlet port 11, the shared cutoff valve 12, the measuring tank 13, the first pressure sensor 141, the pressure regulating valve 16, the second pressure sensor 142, and the outlet port 33. The pressure regulating valve 16 is connected to the controller 19 for controlling pressure based on a pressure difference between a first pressure signal from the first pressure sensor 141 and a second pressure signal from the second pressure sensor 142. The pressure regulating valve 16 further includes a pilot valve not shown for controlling the pressure of a pressure control chamber not shown and a drive part 161 for driving the pilot valve. An actuator of the drive part 161 is operated by an electric signal from the controller 19 to move the pilot valve up and down. By moving the pilot valve up and down, the secondary side pressure of the pressure regulating valve 16 is feedback-controlled.

The controller 19 can be connected to a pressure signal input device not shown for externally inputting a pressure signal, instead of the first pressure signal from the first pressure sensor 141 and the second pressure signal from the second pressure sensor 142. When the pressure signal is inputted from outside to the controller 19, the check valves 31A, 31B, and 31C provided in the gas lines A, B, and C of the process gas line 2 can be sealed to avoid malfunctions thereof A concrete method thereof will be mentioned later.

<Explanation of Operations>

The following explanation is given to the feedback control of the secondary side pressure of the pressure regulating valve 16 based on an electric signal from the controller 19 which is a feature of the third embodiment.

To the controller 19, the first pressure signal from the first pressure sensor 141 and the second pressure signal from the second pressure sensor 142 are inputted. For instance, when the secondary side pressure of the pressure regulating valve 16 decreases, the second pressure signal from the second pressure sensor 142 becomes lower. When this second pressure signal becomes lower, a pressure signal difference between the first pressure signal and the second pressure signal becomes larger. The controller 19 therefore outputs an electric signal to the drive part 161 to operate the pilot valve not shown of the pressure regulating valve 16. In response to the electric signal from the controller 19, the actuator of the drive part 161 is operated to move the pilot valve downward. As the pilot valve is moved downward, deforming the diaphragm downward to push the poppet valve element in a similar manner as the pressure regulating valve 15 of the first embodiment. Accordingly, the valve opening degree of the poppet valve element with respect to the valve chamber is opened, allowing a larger amount of process gas to flow from the valve chamber to the pressure control chamber, thereby increasing the pressure of the pressure control chamber. As the pressure of the pressure control chamber increases, the secondary side pressure of the pressure regulating valve 16 is increased via the returning passage.

The third embodiment differs from the first embodiment in that the pilot valve is directly moved up and down by the electric signal based on the pressure signal to thereby operate the diaphragm in the pressure control chamber. Accordingly, the feedback control of the secondary side pressure of the pressure regulating valve 16 can be performed more rapidly and more accurately.

Furthermore, by utilizing the control function of the controller 19, the check valves 31A, 31B, and 31C provided in the branching connection lines connected to the gas lines A, B, and C of the process gas line 2 can be sealed as below.

The check valves are generally configured to open only to allow gas to flow from upstream to downstream in order to prevent backflow of gas. However, there is a case where the check valve(s) is not fully closed during the gas flow-rate verification. In case the check valve(s) is not completely closed, gas may flow back, causing a variation in volume. Although such gas backflow is not caused every time the verification is performed, it is problematic if the backflow occurs during the gas flow-rate verification, which interferes with accurate flow rate verification.

Figure 8:
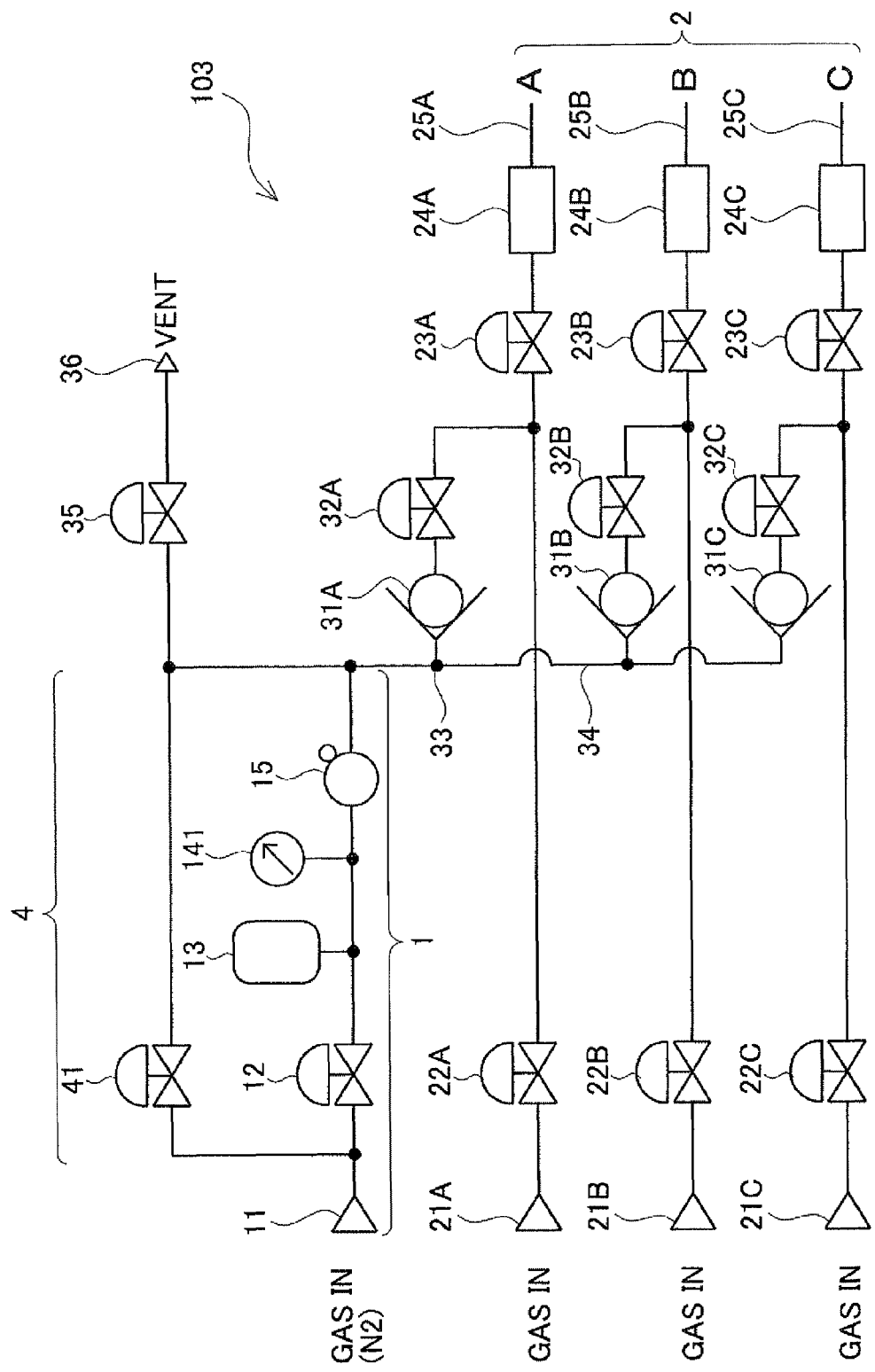
FIG. 8 is a gas circuit diagram (a main part) in which a bypass line is provided for the gas flow-rate verification system shown in FIG. 1.
Figure 9A:
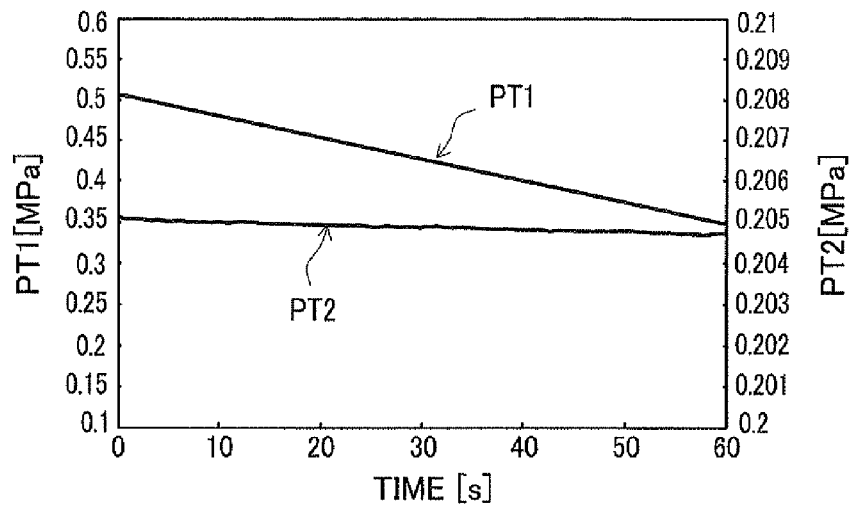
FIGS. 9A to 9C are graphs showing relationships between primary side pressure and secondary side pressure of a pressure regulating valve in a conventional gas flow-rate verification system.
Figure 9B:
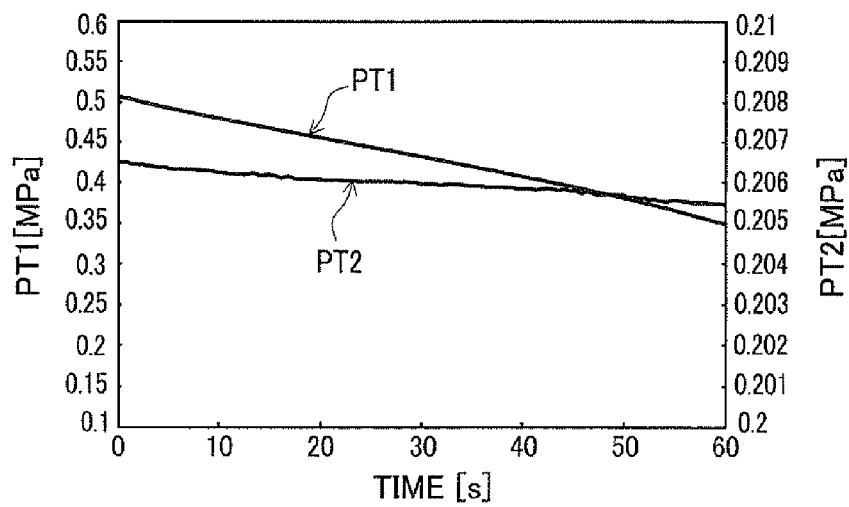
Figure 9C:
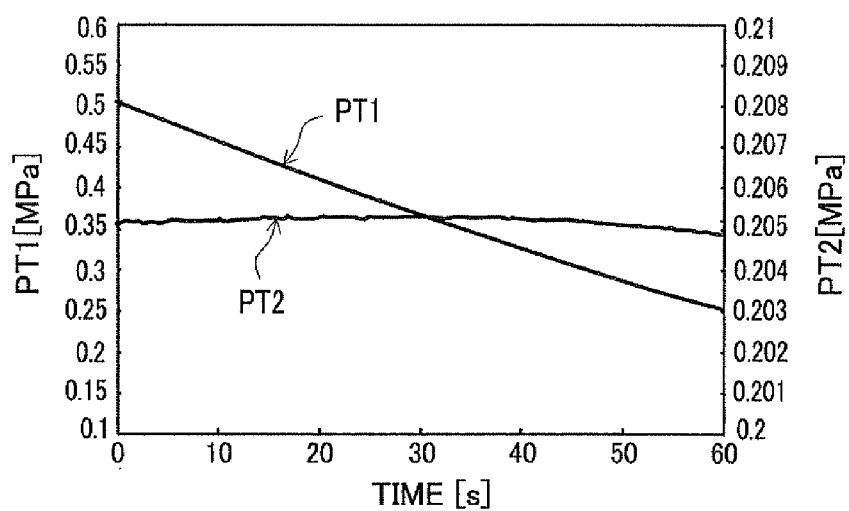

To avoid such a disadvantage, a bypass line 4 connecting the shared gas supply source 11 to the process gas line 2 may be provided (for an example thereof, refer to FIG. 8). FIG. 8 shows a gas circuit diagram (a main part) 103 in which a bypass line is added to the gas flow-rate verification system shown in FIG. 1.

A method of avoiding malfunctions of the check valves by using this bypass line 4 will be briefly explained.

Before the gas flow-rate verification is performed, as shown in FIG. 8, a cutoff valve 41 of the bypass line 4 is opened to cause the gas pressure (e.g., 0.5 MPa) of the gas supply source to act on the check valves 31A, 31B, and 31C. Thereafter, the cutoff valve 41 of the bypass line 4 is closed and the discharge valve 35 of the gas discharge line is opened to discharge the gas staying in the primary side (upstream side) of the valves 31A, 31B, and 31C. Accordingly, while keeping the secondary side pressure of the valves 31A, 31B, and 31C at the gas pressure (e.g., 0.5 MPa) of the shared gas supply source, the primary side pressure of the check valves 31A, 31B, and 31C can be reduced to the secondary side pressure (e.g., 0.2 MPa) of the pressure regulating valve 15. By reducing the primary side pressure of the check valves 31A, 31B, and 31C, the check valves 31A, 31B, and 31C can be reliably sealed. This can avoid malfunctions of the check valves 31A, 31B, and 31C.

However, the aforementioned bypass line 4 does not directly serve to supply of process gas and therefore it is generally preferable not to add the bypass line 4.

According to the present embodiment, by utilizing the control function of the controller 19, the check valves 31A, 31B, and 31C provided in the branching connection lines connected to the gas lines A, B, and C of the process gas line 2 can be sealed. An operating method thereof will be explained below.

The controller 19 is directly connected to a pressure signal input device not shown for externally inputting a pressure signal. The pressure signal input device sets the second pressure signal to the controller 19 to for example 0.5 MPa, so that a gas pressure of 0.5 MPa acts on the valves 31A, 31B, and 31C of the gas lines A, B, and C. Then, the cutoff valve 35 of the gas discharge line is opened to discharge the gas staying on an upstream side of the check valves 31A, 31B, and 31C. In addition, the pressure signal input device sets the second pressure signal to the controller 19 to 0.2 MPa, so that a gas pressure of 0.2 MPa acts on the check valves 31A, 31B, and 31C. Accordingly, the upstream side pressure of each of the check valves 31A, 31B, and 31C is reduced to 0.2 MPa while the downstream side pressure of the check valves 31A, 31B, and 31C is maintained at 0.5 MPa. By reducing the upstream side pressure of the check valves 31A, 31B, and 31C, the check valves 31A, 31B, and 31C can be reliably sealed. This can reliably prevent malfunctions of the check valves 31A, 31B, and 31C.

<Operations and Advantageous Effects>

According to the gas flow-rate verification system 102 and the gas flow-rate verification unit 3 of the present embodiment, as explained above in detail, the second pressure sensor 142 for measuring the secondary side pressure of the pressure regulating valve 16 is located in or downstream of the pressure regulating valve 16. The pressure regulating valve 16 is connected to the controller 19 for controlling pressure based on a pressure signal difference between the first pressure signal from the first pressure sensor 141 and the second pressure signal from the second pressure sensor 142. Accordingly, the secondary side pressure of the pressure regulating valve 16 can be kept constant even when the primary side pressure of the same varies.

To be concrete, the secondary side pressure of the pressure regulating valve 16 is feedback-controlled, so that the secondary side pressure of the pressure regulating valve 16 can be reduced even when the gas pressure of the shared gas supply source varies. Further, the primary side pressure and the secondary side pressure of the pressure regulating valve 16 are directly measured and pressure control is performed based on a pressure difference between those pressures. The secondary side pressure of the pressure regulating valve 16 can be more stably maintained.

When the pressure control function of the controller 19 is utilized, any bypass line is not needed to be provided in order to prevent malfunctions of the check valves 31A, 31B, and 31C provided in the gas lines A, B. and C of the process gas line 2. This makes it possible to achieve a simpler circuit configuration of the gas flow-rate verification system 102 and the gas flow-rate verification unit 3.

The present invention is not limited to the aforementioned embodiments and may be embodied in other specific forms without departing from the essential characteristics thereof.

In the first embodiment explained above, the measuring tank 13 is provided in the manifold 17 and has a rectangular cross section, but it is not necessarily to such a rectangular shape. For example, the cross section may be polygonal including projections and depressions. By such a polygonal cross section having projections and depressions, an inner surface area of the tank contacting with gas is increased, thereby enabling rapid heat exchange with the process gas and increasing a pressure drop range usable for the gas flow-rate verification.

Industrial Availability

The present invention is usable in a gas flow-rate verification system and a gas flow-rate verification unit for verifying or checking a flow rate of a flow control device (a mass flow controller and others) to be used in a gas supply system for process gas and others in a semiconductor manufacturing device, for example.

DESCRIPTION OF THE REFERENCE SIGNS 1, 3, 10 Shared gas line
2, 20 Process gas line
4 Bypass line
11 Shared gas inlet port
12 Shared cutoff valve
13, 13A, 13B, 13C Measuring tank
15, 15A, 15B, 15C Pressure regulating valve
16 Pressure regulating valve
17 Manifold
18 Thermometer
19 Controller
21A, 21B, 21C Process gas inlet port
22A, 22B, 22C First line cutoff valve
23A, 23B, 23C Second line cutoff valve
24A, 24B, 24C Flow rate control device
25A, 25B, 25C Supply pipe
31A, 31B, 31C Check valve
32A, 32B, 32C Connecting cutoff valve
33 Shared gas outlet port
34 Branch pipe
35 Discharge valve
41 Bypass cutoff valve
100, 101, 102 Gas flow-rate verification system
141 First pressure sensor
142 Second pressure sensor

The invention claimed is:

1. A gas flow-rate verification system for use with a process gas supply source and a process chamber, the gas flow-rate verification system comprising:
a plurality of process gas lines each including a first line cutoff valve, a second line cutoff valve;
a flow control device configured to supply gas from the process gas supply source to the process chamber through the first line cutoff valve, the second line cutoff valve, and the flow control device; and
a shared gas line connected in a branch form to the process gas lines to discharge gas from a shared gas supply source through the second line cutoff valve and the flow control device; wherein:
the shared gas line includes a shared cutoff valve, a measuring tank, a first pressure sensor, and a pressure regulating valve,
in response to closing the first line cutoff valve and the shared cutoff valve, the first pressure sensor is configured to measure a pressure drop of gas in the tank to verify a flow rate of the flow control device,
the pressure regulating valve is configured to feedback-control a secondary side pressure of the pressure regulating valve,
the measuring tank is provided in a manifold on an upper end of which the first pressure sensor and the pressure regulating valve are placed,
the manifold is formed with flow passages configured to separately communicate with an inside of the tank to respectively connect each of the first pressure sensor and the pressure regulating valve to the tank, and
the volume of the tank is about 50 cc or more.

2. The gas flow-rate verification system according to claim 1, further including
a second pressure sensor for measuring the secondary side pressure of the pressure regulating valve, the second pressure sensor being located in or downstream of the pressure regulating valve, and
wherein the pressure regulating valve includes a controller for controlling pressure based on a pressure signal difference between a first pressure signal from the first pressure sensor and a second pressure signal from the second pressure sensor.

3. The gas flow-rate verification system according to claim 1, further comprising:
a second pressure sensor for measuring the secondary side pressure of the pressure regulating valve, the second pressure sensor being located in or downstream of the pressure regulating valve,
wherein the pressure regulating valve includes a controller for controlling pressure based on a pressure signal difference between a first pressure signal from the first pressure sensor and a second pressure signal from the second pressure sensor, and the manifold includes, in a lower end, a cover member sealing a lower end of the tank.

4. A gas flow-rate verification system for use with a process gas supply source and a process chamber, the gas flow-rate verification system comprising:
 a plurality of process gas lines each including a first line cutoff valve, a second line cutoff valve;
 a flow control device configured to supply gas from the process gas supply source to the process chamber through the first line cutoff valve, the second line cutoff valve, and the flow control device; and
 a shared gas line connected in a branch form to the process gas lines to discharge gas from a shared gas supply source through the second line cutoff valve and the flow control device; wherein:
 each of the process gas lines includes a measuring tank, a first pressure sensor, and a pressure regulating valve between the first line cutoff valve and the second line cutoff valve, and the shared gas line includes a shared cutoff valve,
 in response to closing the first line cutoff valve and the shared cutoff valve, the first pressure sensor is configured to measure a pressure drop of gas in the tank to verify a flow rate of the flow control device,
 the pressure regulating valve is configured to feedback-control a secondary side pressure of the pressure regulating valve,
 the measuring tank is provided in a manifold on an upper end of which the first pressure sensor and the pressure regulating valve are placed,
 the manifold is formed with flow passages configured to separately communicate with an inside of the tank to respectively connect each of the first pressure sensor and the pressure regulating valve to the tank, and
 the volume of the tank is about 50 cc or more.

5. The gas flow-rate verification system according to claim 4, further including
 a second pressure sensor for measuring the secondary side pressure of the pressure regulating valve, the second pressure sensor being located in or downstream of the pressure regulating valve, and
 wherein the pressure regulating valve includes a controller for controlling pressure based on a pressure signal difference between a first pressure signal from the first pressure sensor and a second pressure signal from the second pressure sensor.

6. The gas flow-rate verification system according to claim 4, further comprising:
 a second pressure sensor for measuring the secondary side pressure of the pressure regulating valve, the second pressure sensor being located in or downstream of the pressure regulating valve, and
 wherein the pressure regulating valve includes a controller for controlling pressure based on a pressure signal difference between a first pressure signal from the first pressure sensor and a second pressure signal from the second pressure sensor, and
 the manifold includes, in a lower end, a cover member sealing a lower end of the tank.

7. A gas flow-rate verification unit for use with a process gas supply source and a process chamber, the gas flow-rate verification system comprising:
 a shared gas line connected in a branch form to a plurality of process gas lines each including a first line cutoff valve, a second line cutoff valve;
 a flow control device configured to supply gas from the process gas supply source to the process chamber through the first line cutoff valve, the second line cutoff valve, and the flow control device, the shared gas line being configured to discharge gas from a shared gas supply source through the second line cutoff valve and the flow control device to the process gas lines; wherein:
 the shared gas line includes a shared cutoff valve, a measuring tank, a first pressure sensor, and a pressure regulating valve,
 in response to closing the first line cutoff valve and the shared cutoff valve, the first pressure sensor is configured to measure a pressure drop of gas in the tank to verify a flow rate of the flow control device,
 the pressure regulating valve includes a control device configured to feedback-control a secondary side pressure of the pressure regulating valve,
 the measuring tank is provided in a manifold on an upper end of which the first pressure sensor and the pressure regulating valve are placed,
 the manifold is formed with flow passages configured to separately communicate with an inside of the tank to respectively connect each of the first pressure sensor and the pressure regulating valve to the tank, and
 the volume of the tank is about 50 cc or more.

8. The gas flow-rate verification unit according to claim 7, further including
 a second pressure sensor for measuring the secondary side pressure of the pressure regulating valve, the second pressure sensor being located in or downstream of the pressure regulating valve, and
 the control device includes a controller for controlling pressure based on a pressure signal difference between a first pressure signal from the first pressure sensor and a second pressure signal from the second pressure sensor.

9. The gas flow-rate verification unit according to claim 7, further comprising:
 a second pressure sensor for measuring the secondary side pressure of the pressure regulating valve, the second pressure sensor being located in or downstream of the pressure regulating valve,
 wherein the control device includes a controller for controlling pressure based on a pressure signal difference between a first pressure signal from the first pressure sensor and a second pressure signal from the second pressure sensor, and
 the manifold includes, in a lower end, a cover member sealing a lower end of the tank.

10. A gas flow-rate verification unit for use with a process gas supply source and a process chamber, the gas flow-rate verification system comprising:
 a shared gas line connected in a branch form to a plurality of process gas lines each including a first line cutoff valve, a second line cutoff valve;
 a flow control device configured to supply gas from the process gas supply source to the process chamber through the first line cutoff valve, the second line cutoff valve, and the flow control device, the shared gas line being configured to discharge gas from a shared gas supply source through the second line cutoff valve and the flow control device to the process gas lines; wherein:
 each of the process gas lines includes a measuring tank, a first pressure sensor, and a pressure regulating valve between the first line cutoff valve and the second line cutoff valve, and the shared gas line includes a shared cutoff valve, in response to closing the first line cutoff valve and the shared cutoff valve, the first pressure sensor is configured to measure a pressure drop of gas in the tank to verify a flow rate of the flow control device, the pressure regulating valve includes a control device configured to feed-back control a secondary side pressure of the pressure regulating valve, the measuring tank is provided in a manifold on an upper end of which the first pressure sensor and the pressure regulating valve are placed, the manifold is formed with flow passages configured to separately communicate with an inside of the tank to respectively connect each of the first pressure sensor and the pressure regulating valve to the tank, and the volume of the tank is about 50 cc or more.

11. The gas flow-rate verification unit according to claim 10, further including a second pressure sensor for measuring the secondary side pressure of the pressure regulating valve, the second pressure sensor being located in or downstream of the pressure regulating valve, and the control device includes a controller for controlling pressure based on a pressure signal difference between a first pressure signal from the first pressure sensor and a second pressure signal from the second pressure sensor.

12. The gas flow-rate verification unit according to claim 10, further comprising:

a second pressure sensor for measuring the secondary side pressure of the pressure regulating valve, the second pressure sensor being located in or downstream of the pressure regulating valve, wherein the control device includes a controller for controlling pressure based on a pressure signal difference between a first pressure signal from the first pressure sensor and a second pressure signal from the second pressure sensor, and the manifold includes, in a lower end, a cover member sealing a lower end of the tank.

* * * * *